US010658645B2

(12) United States Patent
Nakayama et al.

(10) Patent No.: US 10,658,645 B2
(45) Date of Patent: May 19, 2020

(54) BUSBAR MODULE

(71) Applicants:AUTONETWORKS TECHNOLOGIES, LTD., Yokkaichi-shi, Mie (JP); SUMITOMO WIRING SYSTEMS, LTD., Yokkaichi-shi, Mie (JP); SUMITOMO ELECTRIC INDUSTRIES, LTD., Osaka-shi, Osaka (JP); ENVISION AESC JAPAN LTD., Zama-shi, Kanagawa (JP)

(72) Inventors: Osamu Nakayama, Yokkaichi (JP); Tetsuya Fujita, Yokkaichi (JP); Yasuhiro Yanagihara, Kanagawa (JP); Kodai Nagano, Kanagawa (JP); Manato Itabashi, Kanagawa (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP); ENVISION AESC JAPAN LTD., Zama (JP)

( * ) Notice: Subject to any disclaimer, the term of this patent is extended or adjusted under 35 U.S.C. 154(b) by 167 days.

(21) Appl. No.: 16/046,479

(22) Filed: Jul. 26, 2018

(65) Prior Publication Data
US 2019/0051882 A1 Feb. 14, 2019

(30) Foreign Application Priority Data

Aug. 9, 2017 (JP) ................................. 2017-154018

(51) Int. Cl.
*H01M 2/20* (2006.01)
*H01R 25/16* (2006.01)
*H01M 2/10* (2006.01)

(52) U.S. Cl.
CPC ......... *H01M 2/206* (2013.01); *H01M 2/1077* (2013.01); *H01R 25/161* (2013.01); *H01M 2220/20* (2013.01)

(58) Field of Classification Search
CPC ............... H01M 2/206; H01M 2/1077; H01M 2220/20; H01M 2/20; H01M 2/26; H01R 25/161

(Continued)

(56) References Cited

U.S. PATENT DOCUMENTS 6,261,719 B1  7/2001  Ikeda et al.
2014/0057152 A1*  2/2014  Furuya ................. H01M 2/206
                                                              429/121

FOREIGN PATENT DOCUMENTS

JP    2000-149909 A    5/2000

* cited by examiner

Primary Examiner — Gary D Harris
(74) Attorney, Agent, or Firm — Oliff PLC

(57) ABSTRACT

A busbar module includes a busbar holding plate and a busbar cover attached to the busbar holding plate. The busbar holding plate includes a busbar holding face and a bearing including a hole and a wall to define the hole. The busbar cover includes protrusions protruding toward each other in the axial direction at positions corresponding to the hole. The protrusions are opposed to each other with a gap less than a dimension of the hole in the axial direction. The protrusions are disposed in the hole to rotate the busbar cover about the protrusions between a covering position and an uncovering position. The busbar cover is flexible to deform such that the gap expands to allow the wall to pass through the gap during attachment of the bulbar cover to the busbar holding plate and restores its original shape when passing of the wall through the gap is complete.

12 Claims, 20 Drawing Sheets

(58) Field of Classification Search
USPC .......................................................... 429/121
See application file for complete search history.

BUSBAR MODULE

CROSS-REFERENCE TO RELATED APPLICATION

This application claims priority from Japanese Patent Application No. 2017-154018 filed on Aug. 9, 2017. The entire contents of the priority application are incorporated herein by reference.

BACKGROUND OF THE INVENTION

Field of the Invention

The technology described herein relates to a busbar module.

Description of the Related Art

An electric storage module, which is a power source installed in an electric vehicle or a hybrid vehicle, includes electric storage components that include positive electrodes and negative electrodes. The electric storage components are arranged next to one another and the adjacent electrodes are connected via busbars.

An example of such an electric storage module may include a battery assembly that includes rectangular battery cells and a battery connection plates that are attached to the battery assembly. The battery connection plates may include busbars embedded in synthetic resin plate bases. Adjacent electrodes of the rectangular batteries may be connected in series via the busbars. Covers may be attached to the plate bases of the battery connection plates. Each cover and the plate base of the corresponding battery connection plate are connected by an integral hinge. With the integral hinge, the cover can be open and closed. After the battery connection plate is attached to the battery assembly, the battery connection plate is covered with the cover to protect the electrodes and the busbar from foreign substances such as dust and moisture.

Each battery connection plate described above may include an external device connecting terminal to which an external device such as a motor and an inverter is connected. To connect an external device to the external device connecting terminal after the cover is closed to cover the battery connection plate, the cover needs to be open. When the cover is open, the busbars may be subjected to foreign substance in the air such as dust and moisture. Connection of the external device to the external device connecting terminal while protecting the busbar from the foreign substances may reduce work efficiency.

BRIEF SUMMARY OF THE INVENTION

The technology described herein was developed in view of the above circumstances. An object is to provide a busbar module to which an external device can be connected with improved work efficiency.

A busbar module includes a busbar holding plate and a busbar cover. The busbar holding plate includes a busbar holding face for holding a busbar and a bearing that includes a hole. The hole extends in an axial direction that is parallel to the busbar holding face and a wall to define the hole. The busbar cover is attached to the busbar holding plate for covering the busbar. The busbar cover includes two protrusions that protrude toward each other in the axial direction at positions corresponding to the hole. The protrusions are opposed to each other with a gap less than a dimension of the hole in the axial direction. The protrusions are disposed in the hole of the bearing to rotate the busbar cover about the protrusions between a covering position to cover the busbar and an uncovering position to uncover the busbar. The busbar cover is flexible to deform such that the gap between the protrusions expands in the axial direction to allow the wall of the hearing to pass through the gap during attachment of the busbar cover to the busbar holding plate and restores its original shape when passing of the wall through the gap is complete.

According to the configuration, the busbar cover deforms such that the gap between the protrusions expands when the busbar cover is placed over the busbar holding plate and a force is applied to the busbar cover in a direction toward busbar holding plate. The wall of the bearing passes through the gap that has expanded. When the passing of the wall through the gap is complete and the busbar cover restores its original shape, the protrusions are placed in the hole of the bearing. Namely, the busbar cover can be attached to the busbar holding plate only by applying the force to the busbar cover in the direction toward the busbar holding plate.

When the busbar cover is in the covering position, the bulbar is coveted with the bulbar covet. Therefore, the busbar cover is protected from foreign substances.

To connect an external device with the busbar, the busbar cover in the covering position is rotated about the protrusions to the uncovering position. When the busbar cover is in the uncovering position, the busbar is exposed. Therefore, the external device can be connected with the busbar. Because the busbar can be easily exposed only by rotating the busbar cover, work efficiency in connection of the external device with the busbar improves.

According to the technology described herein, work efficiency in connection of the external device with the busbar module improves.

DETAILED DESCRIPTION OF THE INVENTION

Embodiment

Figure 1:
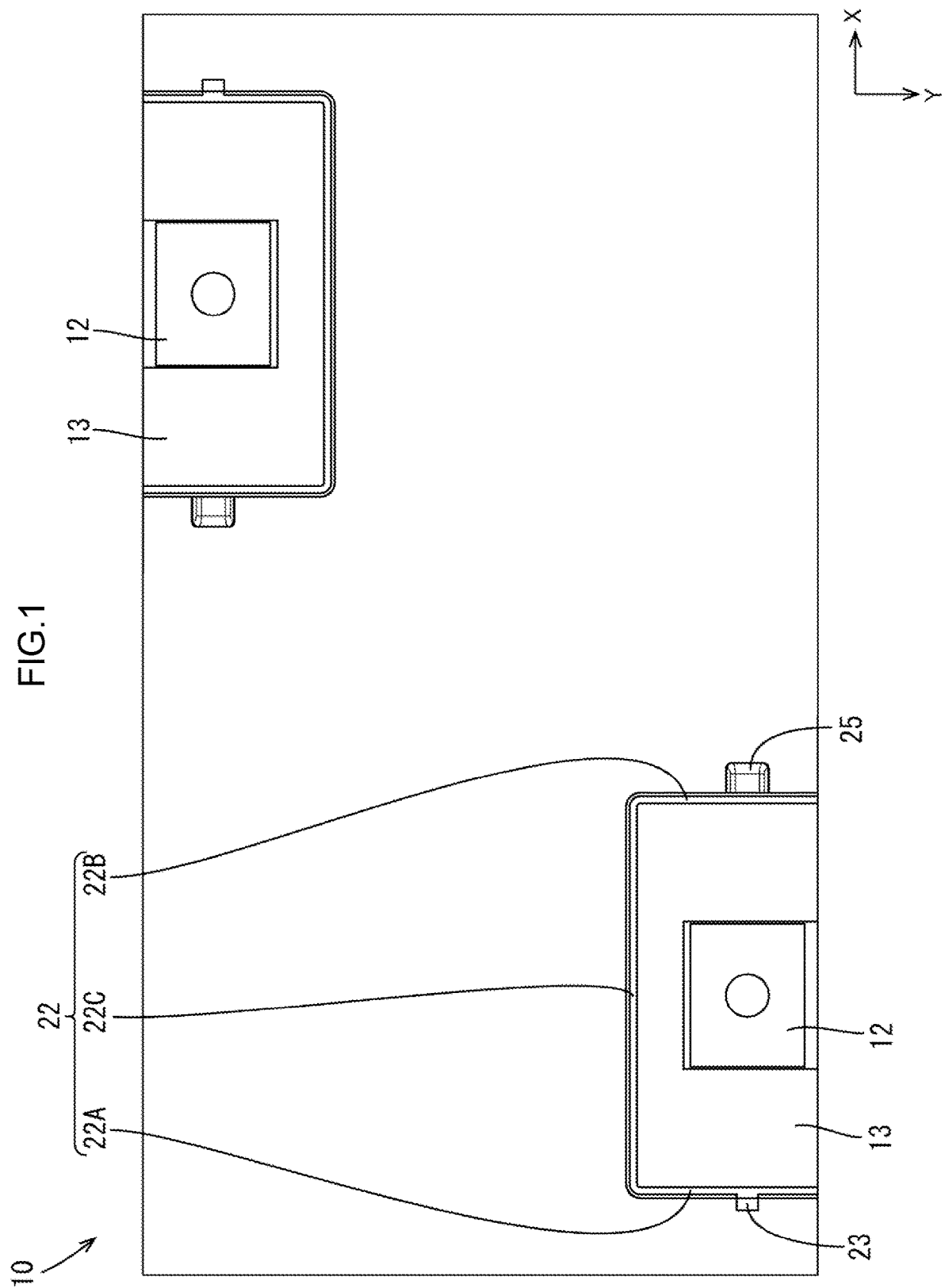
FIG. 1 is a plan view illustrating an electric storage module without busbar covers.

An embodiment of the technology disclosed herein will be described with reference to FIGS. 1 to 22. An electric storage module 10 is a power source installed in a vehicle such as an electric vehicle and a hybrid vehicle and used for driving the vehicle. Sides pointed by X arrows, Y arrows, and Z arrows in the drawings may be referred to as the right side, the front side, and the upper side, respectively. For components having the same configuration, only some of the components may be indicated by reference signs and the rest of the components may not be indicated by reference signs.

Electric Storage Module 10

The electric storage module 10 include electric storage components 11 and busbar assemblies 100. The busbar assemblies 100 each include busbars 12 and busbar modules 47. The busbar modules 47 each include busbar holding plates 13 and busbar covers 14. The busbar holding plates 13 hold the busbars 12, respectively. The busbar covers 14 are attached to the busbar holding plates 13, respectively. The electric storage components 11 each include positive electrodes and negative electrodes. The electric storage components 11 are disposed next to one another and the adjacent electrodes are electrically connected to one another via metal connectors. The electric storage components 11 are connected in series.

One of the busbars 12 made of metal and connected to the positive electrode of a first-end electric storage component. 11 at a first end of the series of the electric storage components 11 is exposed from the top face of the electric storage component 11. Another one of the busbars 12 made of metal and connected to the negative electrode of a second-end electric storage component 11 at a second end of the series of the electric storage components 11 is exposed from the trop face of the electric storage component 11. The busbars 12 are electrically connected to an external device.

Busbar 12

The busbars 12 are prepared by stamping metal plates in a predefined shape. Each busbar 12 has a rectangular shape in a plan view. The busbars 12 include insertion holes 16 that are through holes through which bolts 15 are inserted. The material of the busbars 12 may be selected from copper, copper alloy, aluminum, aluminum alloy, stainless steel, and any other metals as appropriate. The busbar 12 may be plated with tin, nickel, silver, or any other materials as appropriate.

External Device Connecting Member

Figure 13:
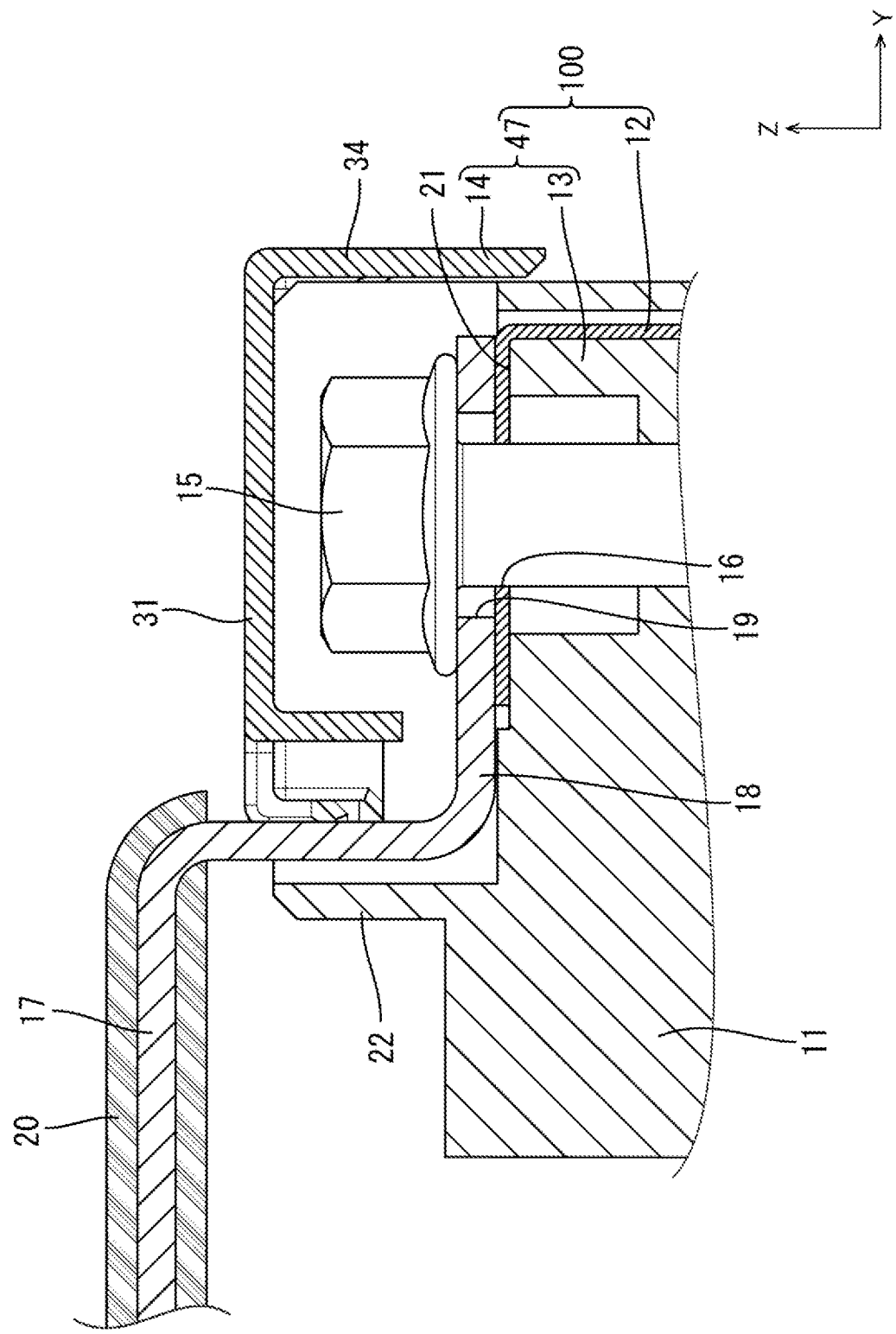
FIG. 13 is a cross-sectional view along line XIII-XIII in FIG. 12.

As illustrated in FIG. 13, external device connecting members 17 are connected to the bus bars 12, respectively. The external device connecting members 17 are metal pieces for electrically connecting the external device to the electric storage module 10. Each external device connecting member 17 is prepared by stamping a metal plate into a predefined shape. Specifically, an end portion of the metal plate of each external device connecting member 17 is bent twice to form a crank shape in a side view. The end portions of the external device connecting members 17 may be referred to as connecting end portions 18 connected with the respective busbars 12. The connecting end portions 18 include insertion holes 19 that are through holes in which the bolts 15 are inserted, respectively. Portions of the external device connecting members 17 other than the connecting end portions 18 are covered with insulating members 20, respectively. The insulating members 20 are made of synthetic resin having insulation properties.

The material of the external device connecting members 17 may be selected from copper, copper alloy, aluminum, aluminum alloy, stainless steel, and any other metal as appropriate. The external device connecting members 17 may be plated with tin, nickel, silver, and any other metal as appropriate.

The connecting end portions 18 of the external device connecting members 17 are placed on the upper surfaces of the respective busbars 12 and the bolts 15 are inserted in the insertion holes 16 of the respective connecting end portions 18 and the insertion holes 16 of the respective busbars 12. Nuts are threaded onto the bolts 15, respectively. With the nuts and the bolts 15, the external device connecting members 17 are electrically and physically connected to the respective busbars 12.

Busbar Holding Plate 13

The busbars 12 are held by busbar holding plates 13 that are made of synthetic resin having insulation properties. The synthetic resin of the busbar holding plates 13 may be selected from polyethylene, polyolefin such as polypropylene, polybutylene terephthalate, polyester such as polypropylene, polyamide such as 6,6-nylone, and any other material as appropriate. Fillers such as glass fibers, talc, and mica may be added to the synthetic resin of the busbar holding plates 13. The material of the busbar holding plates 13 has rigidity higher than that of the busbar covers 14, which will be described later.

The busbar holding plates 13 include busbar holding faces 21 by which the respective busbars 12 are held. The busbars 12 are placed on the respectively busbar holding faces 21. The busbars 12 may be secured to the respective busbar holding plates 13 with a known securing method such as locking tabs, adhesives, and screws.

The busbar holding plates 13 include vertical walls 22 that protrude from the busbar holding faces 21 in a direction normal to the busbar holding faces 21, or protrude upward from the busbar holding faces 21 perpendicular to the busbar holding faces 21. The vertical wall 22 for the busbar 12 on the left side in FIG. 1 includes a left wall portion 22A on the left side, a right wall portion 22B on the right side, and a rear wall portion 220 on the rear side of the busbar 12. A height of the vertical wall 22, that is, a dimension from the busbar holding face 21 to the distal end of the vertical wall 22 is greater than a height of a head of the bolt 15, that is, a dimension of the head in an axial direction of the bolt 15. With the vertical wall 22, the busbar 12, the connecting end portion 18, and the bolt 15 are electrically isolated from others on the left side, the rear side, and the left side.

Figure 2:
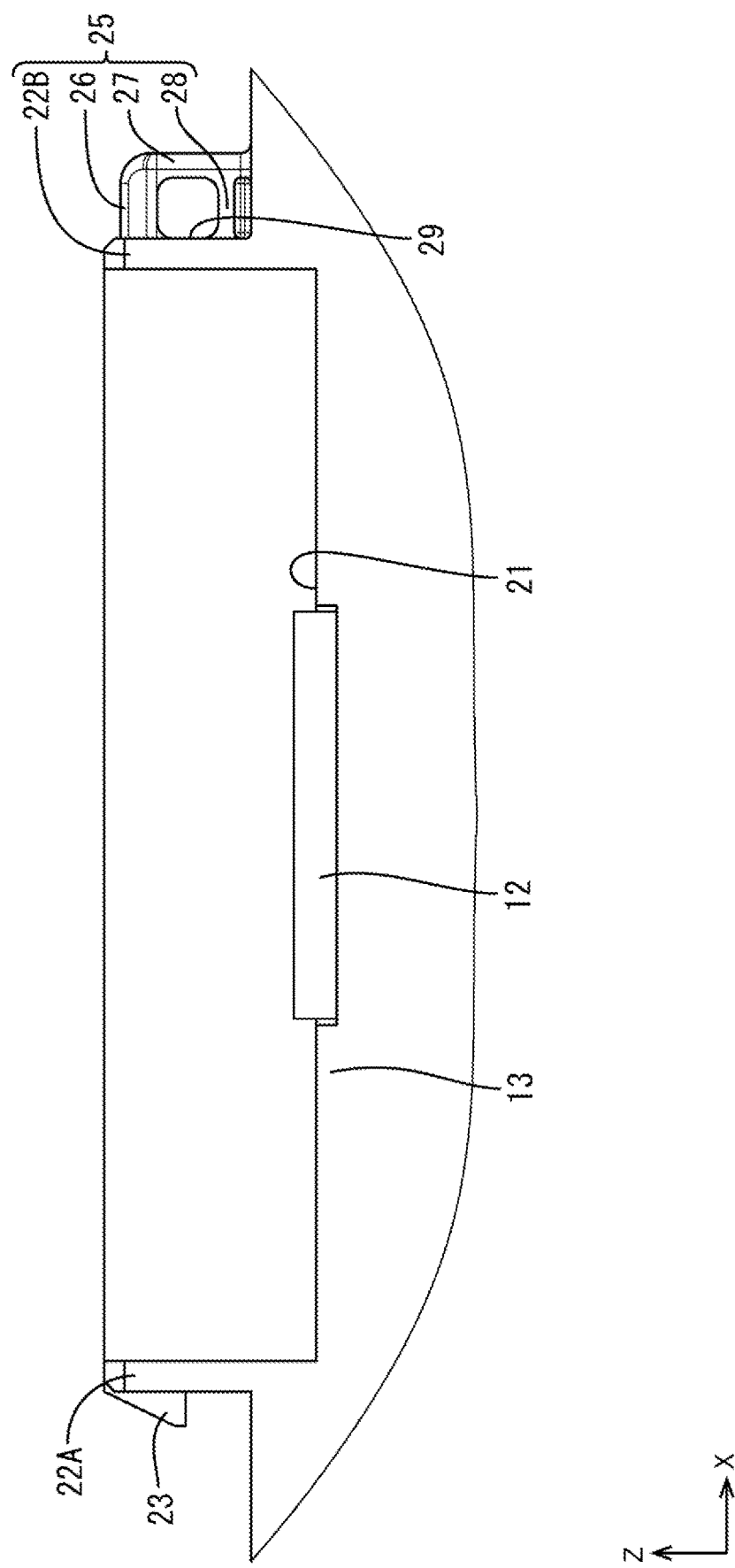
FIG. 2 is an elevated view of a busbar assembly without a busbar cover.
Figure 3:
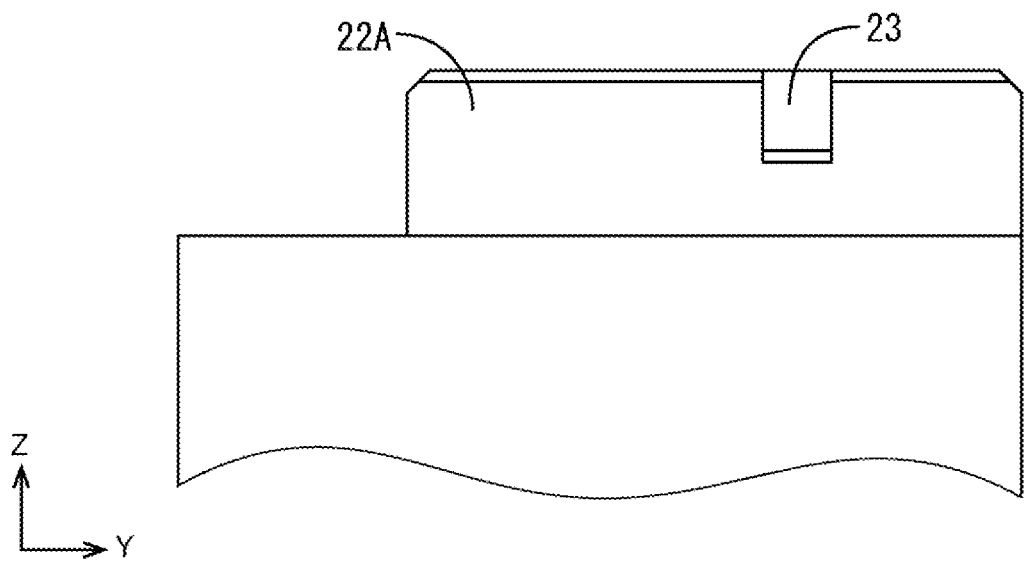
FIG. 3 is a magnified left side view of a portion of the busbar assembly without the busbar cover.
Figure 4:
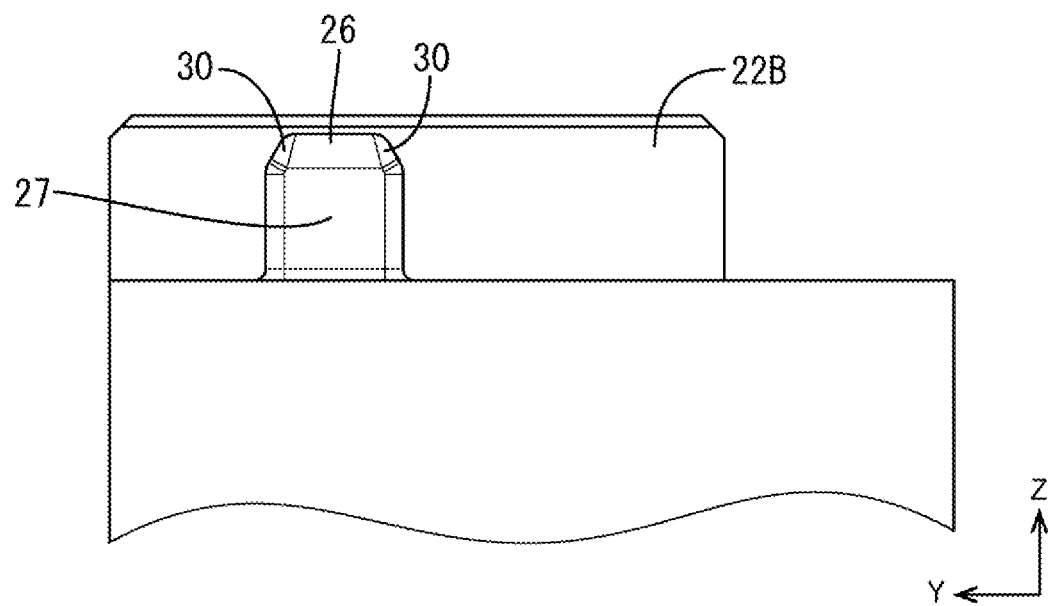
FIG. 4 is a magnified right side view of a portion of the busbar assembly without the busbar cover.
Figure 5:
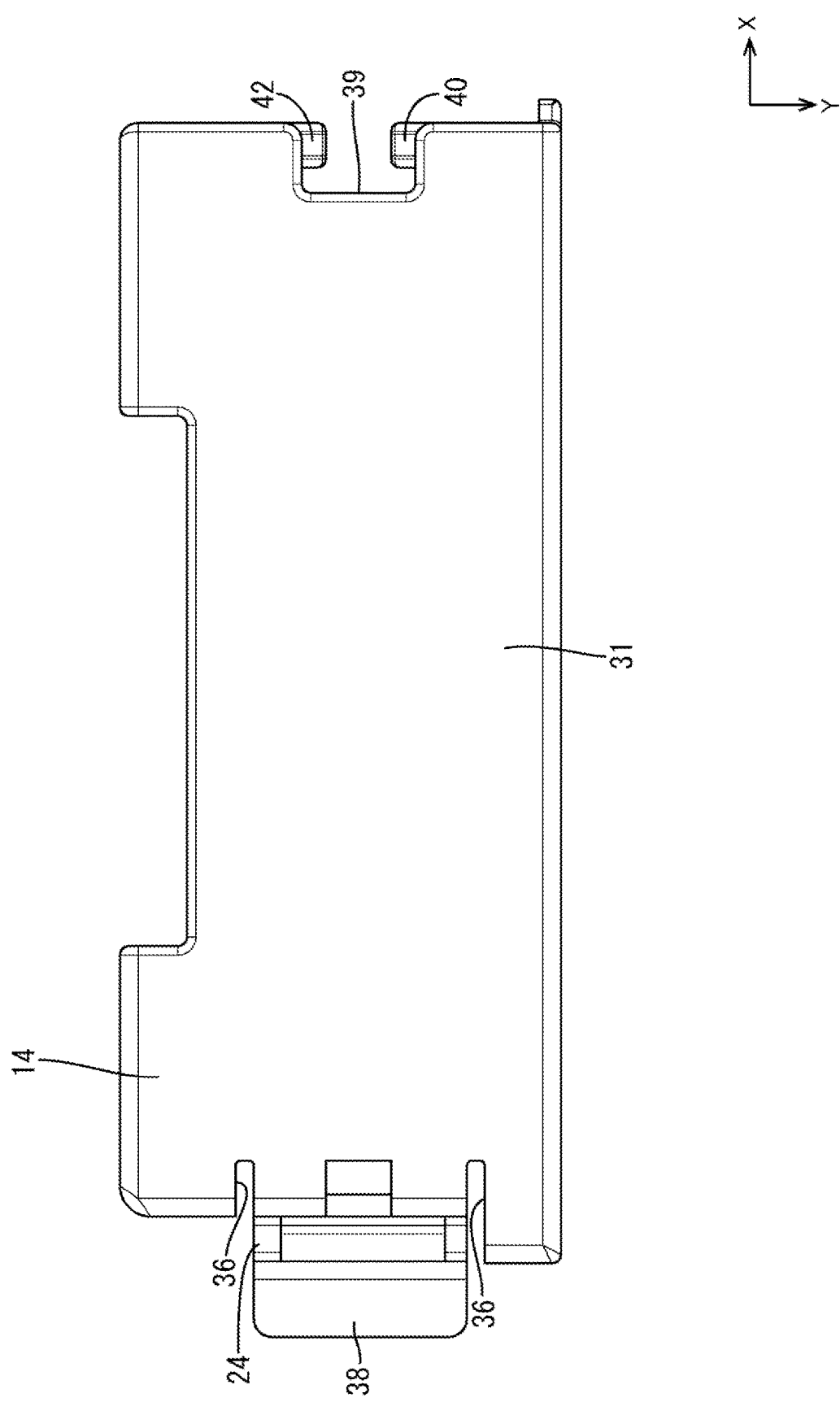
FIG. 5 is a plan view of the busbar cover.
Figure 6:
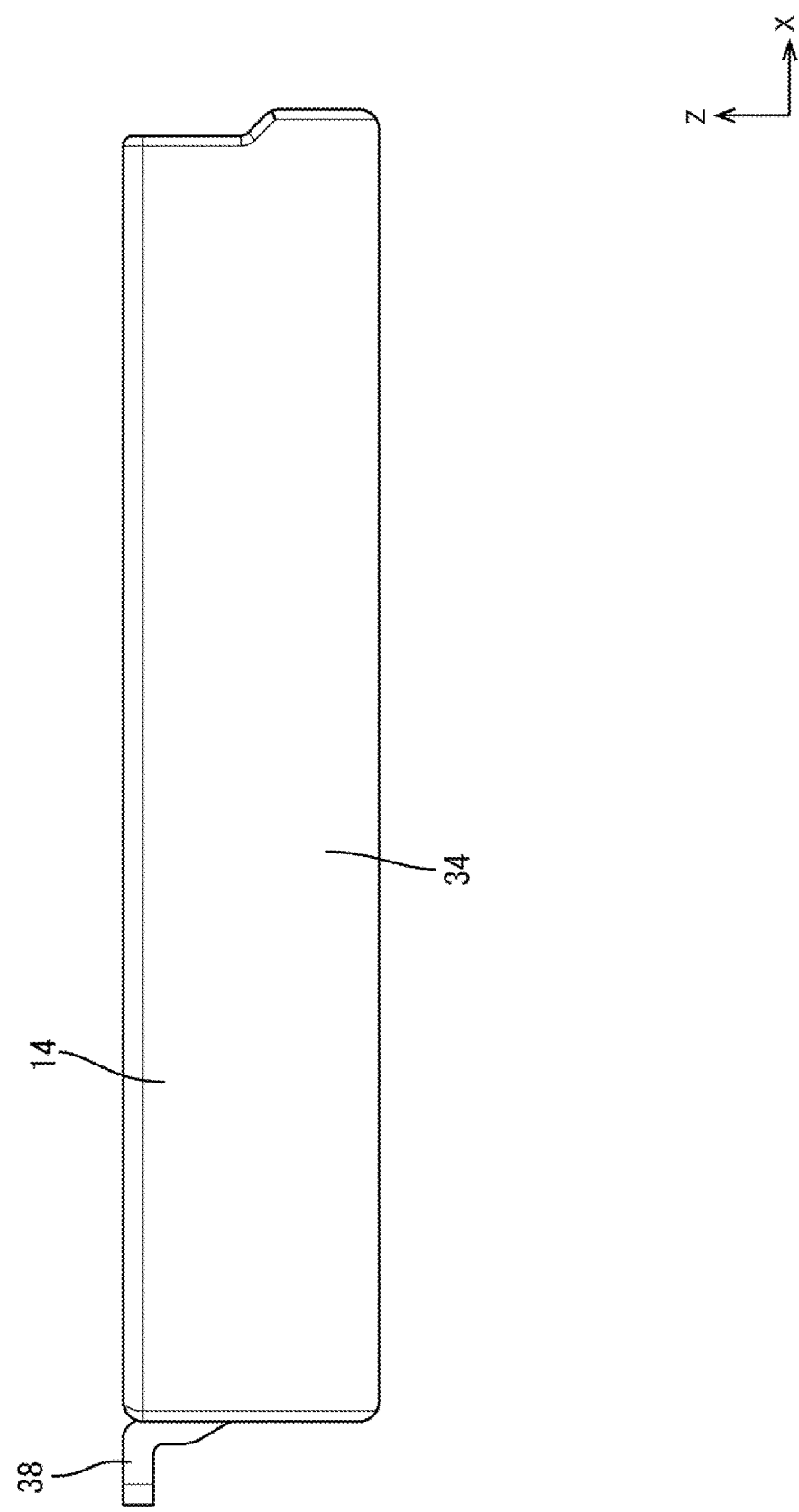
FIG. 6 is an elevated view of the busbar cover.
Figure 7:
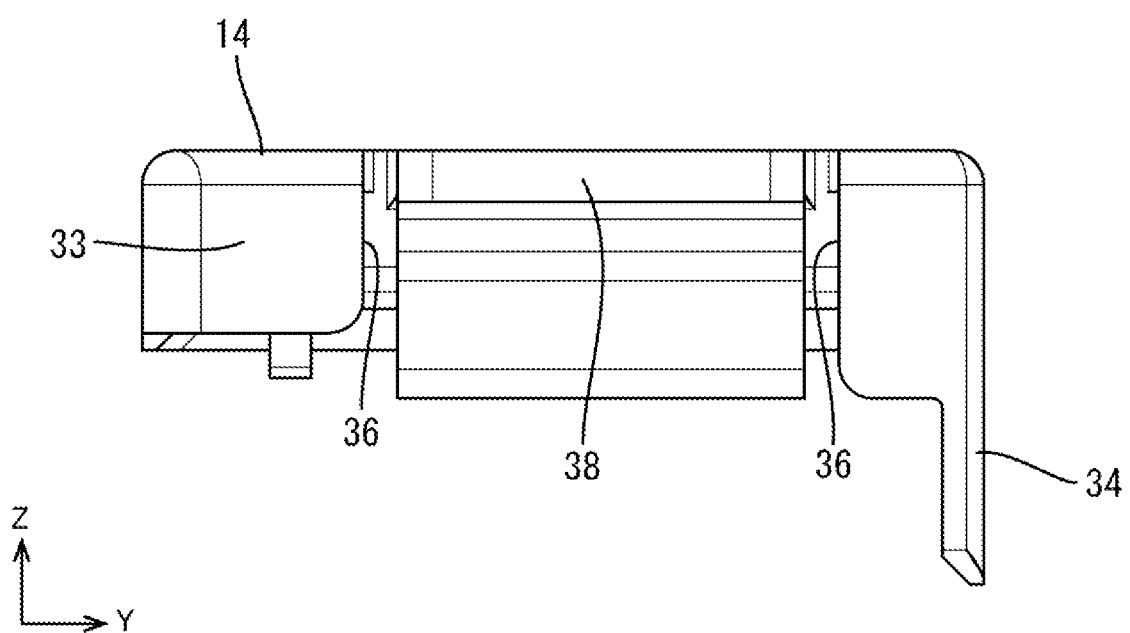
FIG. 7 is a left side view of the busbar covet.
Figure 8:
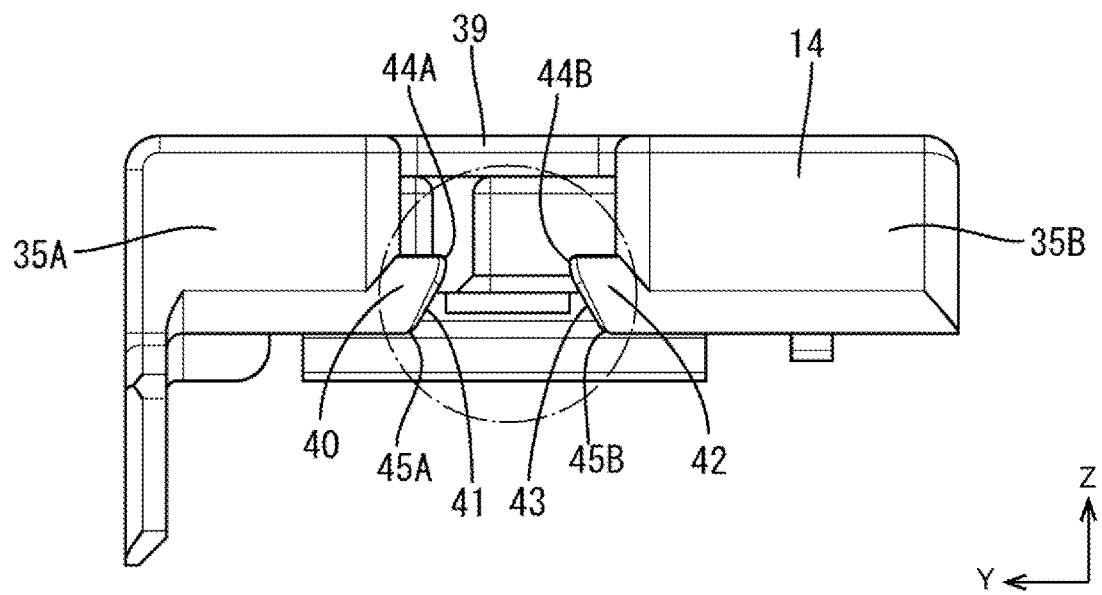
FIG. 8 is a right side view of the busbar cover.
Figure 9:
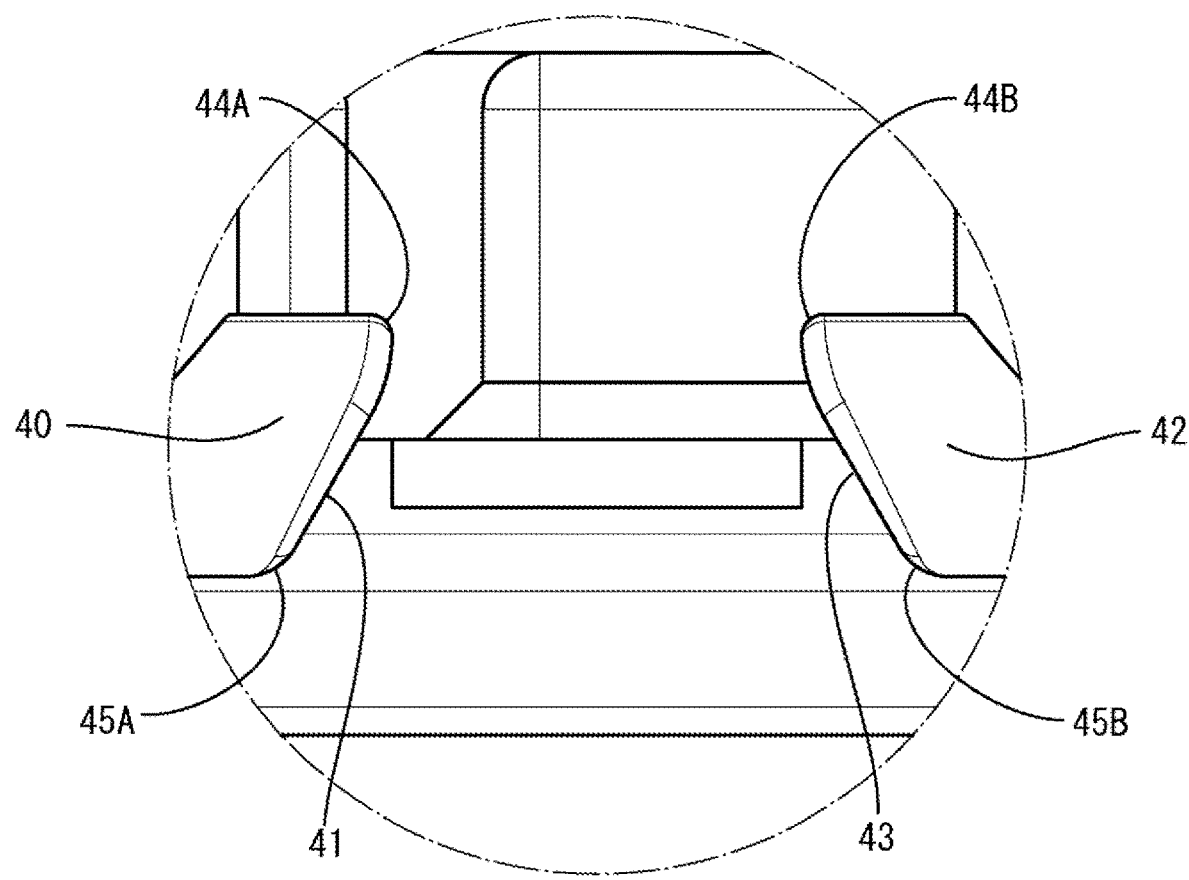
FIG. 9 is a magnified view of a portion of the busbar cover in FIG. 8.
Figure 10:
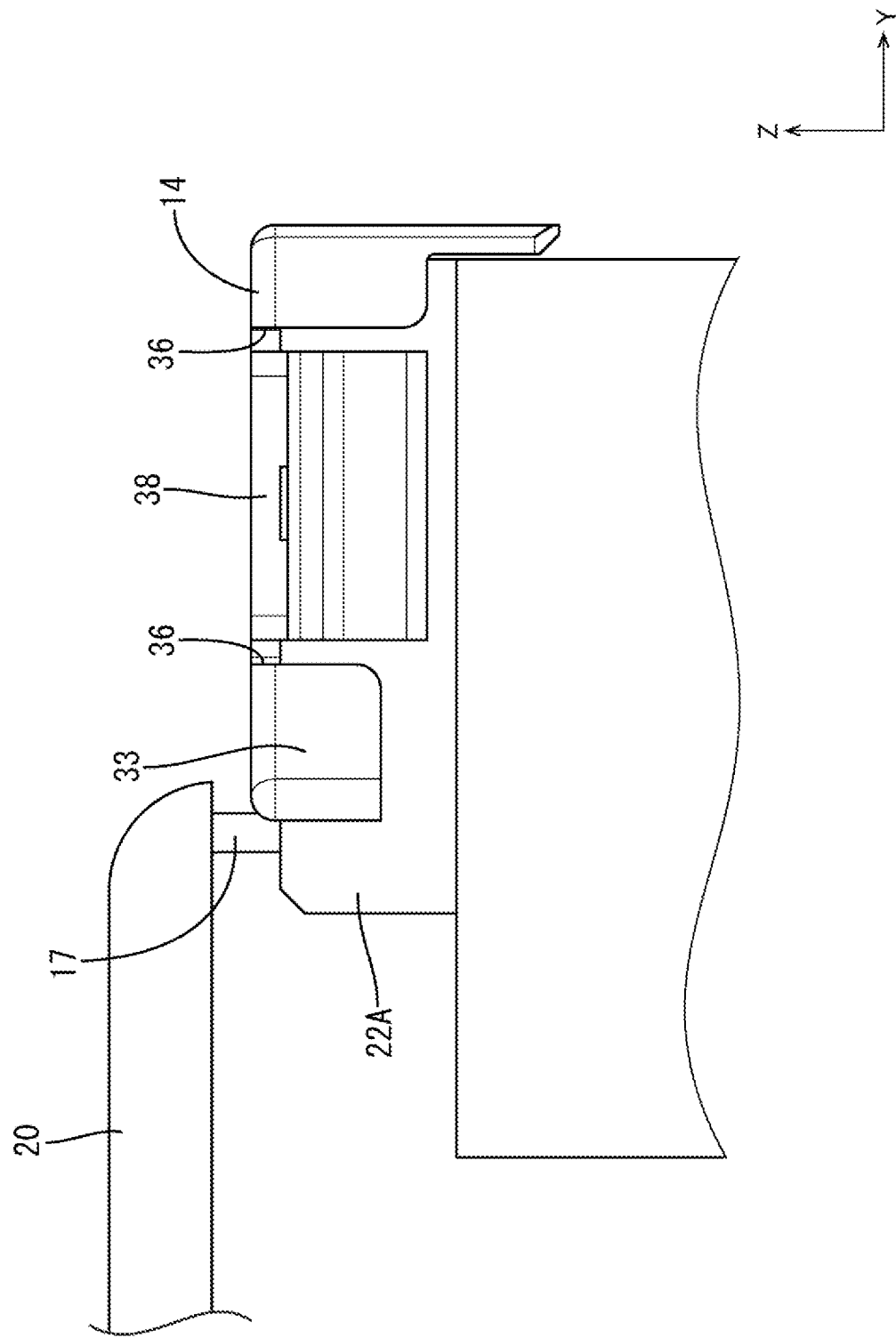
FIG. 10 is a magnified left side view of a portion of the busbar assembly.
Figure 11:
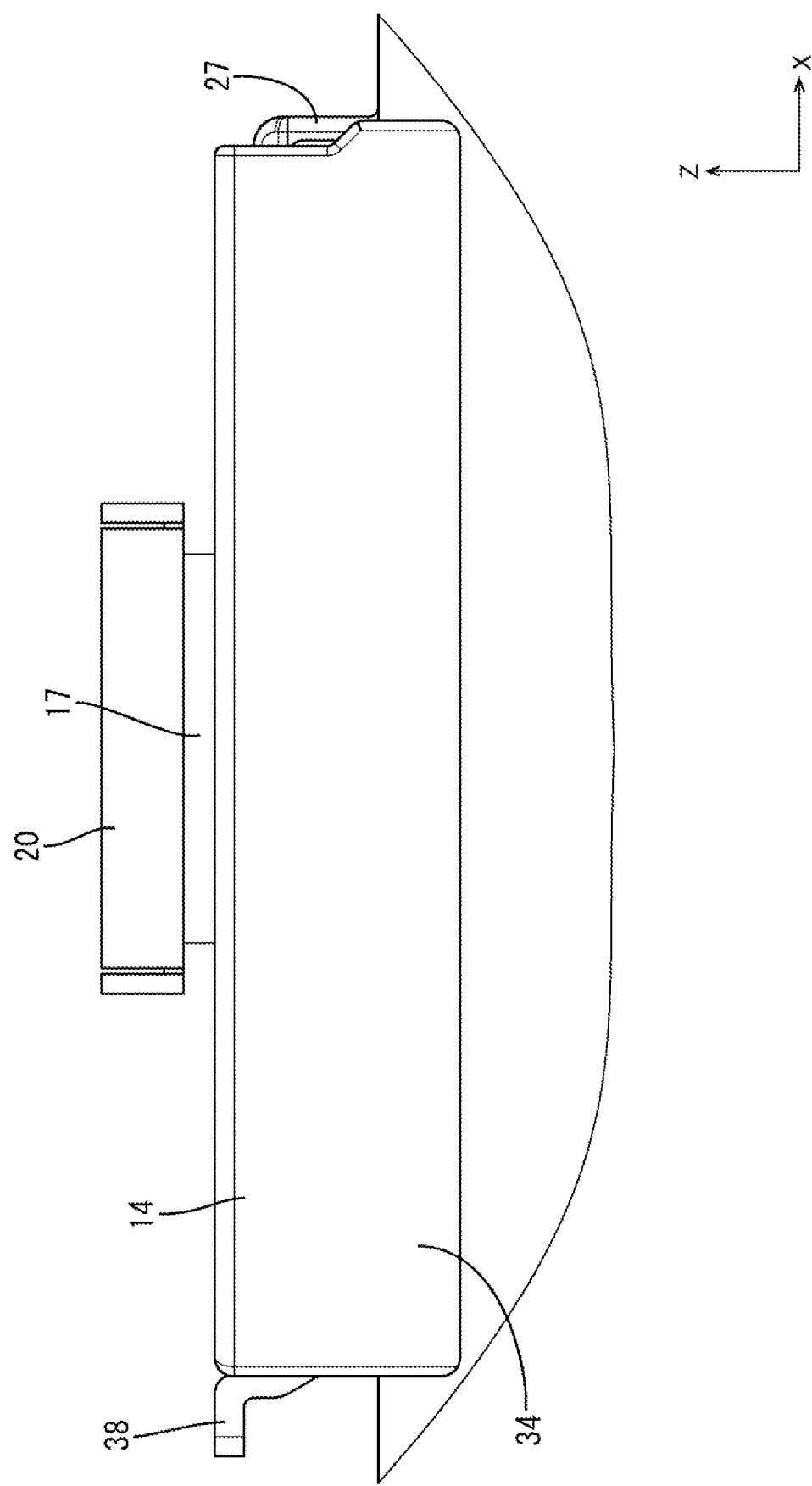
FIG. 11 is an elevated view of the busbar assembly.

As illustrated in FIG. 2, the vertical wall 22 includes a locking tab 23 that protrudes from an outer surface of the left wall portion 22A at a position closer to the top of the left wall portion 22A. The locking tab 23 is engaged with a lock portion 24 of the busbar cover 14, which will be described later. The locking tab 23 has a right triangular shape when viewed from the front side as in FIG. 2. The dimension from the left wall portion 22A to the distal end, of the locking tab 23 is greater in a section of the locking tab 23 closer to the lower end of the lock portion 24 than in a section of the locking tab 23 closer to the upper end of the lock portion 24. The lower end of the locking tab 23 sharply protrudes from the left wall portion 22A.

The busbar holding plate 13 includes a bearing 25 that protrudes from the outer surface of the right wall portion. 22B. The bearing 25 includes a through hole 29 that extends in the front-rear direction and in a quadrilateral shape with rounded corners when viewed from the front side. The bearing 25 is composed of a section of the right wall portion 22B (a first vertical wall), an upper wall 26 (a first horizontal wall), a side wall 27 (a second vertical wall), and a lower wall 28 (a second horizontal wall). The upper wall 26 protrudes from an upper section of the right wall portion 22B and extends parallel to the busbar holding face 21 (toward the right side in FIG. 2). The lower wall 28 protrudes from a lower section of the right wall portion 22B and extends parallel to the busbar holding face 21 (to the right side in FIG. 2). The side wall 27 is connected between distal ends of the upper wall 26 and the lower wall 28 (on the right side in FIG. 2).

The through hole 29 is defined by the section of the right wall portion 22B, the upper wall 26, the side wall 27, and the lower wall 28. Namely, the bearing 25 has a rectangular tubular shape that extends in the front-rear direction. A direction in which an axis of the through hole 29 extends may be referred to as an axial direction A. (see FIGS. 16 and 18), which corresponds with the front-rear direction. The bearing 25 is located at about the middle of the outer surface of the right wall portion 22B with respect to the front-rear direction. The bearing 25 has a dimension L in the front-rear direction. The dimension L is less than a dimension of the right wall portion 22B in the front-rear direction.

The upper wall 26 of the bearing 25 has a rectangular frustum shape that includes a base closer to the busbar holding face 21, a top farther from the busbar holding face 21 and smaller than the base, and slopes between the top and the base and separated from each other in the front-rear direction. The slopes are referred to as bearing-side slopes 30. A dimension P of the top of the upper wall 26 of the bearing 25 in the front-rear direction is less than the dimension L of the base of the upper wall 26 of the bearing 25 in the front-rear direction (see FIG. 16). The vertical walls 22 on the left side and the right side in FIG. 1 are point symmetric and thus the vertical wall 22 on the right side in FIG. 1 has the same configuration as the configuration of the vertical wall 22 on the left side in FIG. 1.

Busbar Cover 14

The busbar covers 14 are attached to the vertical walls 22 of the respective bulbar holding plates 13 from the upper side. A direction from the upper side to the lower side may be referred to an attachment direction B in which the busbar covers 14 are attached to the respective busbar holding plates 13.

The busbar covers 14 are made of synthetic resin having insulation properties. The synthetic resin of the busbar covers 14 may be selected from polyethylene, polyolefin such as polypropylene, polybutylene terephthalate, polyester such as polypropylene, polyamide such as 6,6-nylone, and any other material as appropriate. As described earlier, the busbar holding plates 13 have higher rigidity, that is, the busbar covers 14 are more flexible than the busbar holding plates 13.

As illustrated in FIGS. 5 to 9, each busbar cover 14 includes a top wall 31, a rear wall 32, a left wall 33, a front wall 34, a first right wall 35A, and a second right wall 35B. The top wall 81 is parallel to the busbar holding face 21 when the busbar cover 14 is closed. The top wall 31 has a plate shape with a rectangular shape when viewed from the top. The top wall 31 is flexible. The rear wall 32 extends downward from the rear edge of the top wall 31. The left wall 33 extends downward from the left edge of the top wall 31. The front wall 34 extends downward from the front edge of the top wall 31.

The first right wall 35A and the second right wall 35B extend downward from the right edge of the top wall 31. The first right wall 35A and the second right wall 35B are separated from each other in the front-rear direction. The first right wall 35A is located on the front side and the second right wall 35B is located on the rear side. A distance between the first right wall 35A and the second right wall 35B in the front-rear direction (the axial direction A) is slightly greater than the dimension L of the bearing 25 in the front-rear direction.

The top wall 31 includes a left edge portion that includes two slits 36. With the slits 36, the left edge portion is divided into three sections. One of the sections in the middle is configured into the lock portion 24 that is flexible. The lock portion 24 extends downward from the left edge of the top wall 31. The lock portion 24 includes two bars that are parallel to each other and a connecting section 37 that connects lower ends of the bars together (see FIG. 14). The lower ends are separated from each other in the front-rear direction. The connecting section 37 extends in the front-rear direction. The busbar cover 14 includes a holding portion 38 that extends from the connecting portion 37. The holding portion 38 includes a first section that extends upward from the connecting portion 37 and a second section that extends from an upper edge of the first section to the left side. An assembly person can pinch the second section with his or her fingers to open or close the busbar cover 14.

The busbar cover 14 is locked to the busbar holding plate 13 with the connecting section 37 of the lock portion 24 of the busbar cover 14 placed against the lower end surface of the of the locking tab 23 of the busbar holding plate 13.

The top wall 31 includes a cutout 39 between the first right wall 35A and the second right wall 35B. The cutout 39 is defined by the rear edge of the first right wall 35A, the front edge of the second right wall 35B, and right edge of the top wall 31 between the rear edge of the first right wall 35A, the front edge of the second right wall 35B. The right edge of the top wall 31 is located on the left side relative to the first right wall 35A and the second right wall 35B. The cutout 39 has a rectangular shape when viewed from the top. A dimension of the cutout 39 in the left-right direction is greater than a thickness of the first right wall 35A and the second right wall 35B.

The first right wall 35A includes a first protrusion 40 that protrudes from the lower rear edge of the first right wall 35A toward the rear side (one of two protrusions). The rear face of the first protrusion 40 is angled relative to the axial direction. A of the through hole 29 and referred to as a first protrusion-side slope 41. The first protrusion-side slope 41 is angled toward the rear side.

The second right wall 35B includes a second protrusion 42 that protrudes from the lower front edge of the second right wall 35B toward the front side (the other one of two protrusions). The front face of the second protrusion 42 is angled relative to the axial direction A of the through hole 29 and referred to as a second protrusion-side slope 43. The second protrusion-side slope 43 is angled toward the front side.

Figure 16:
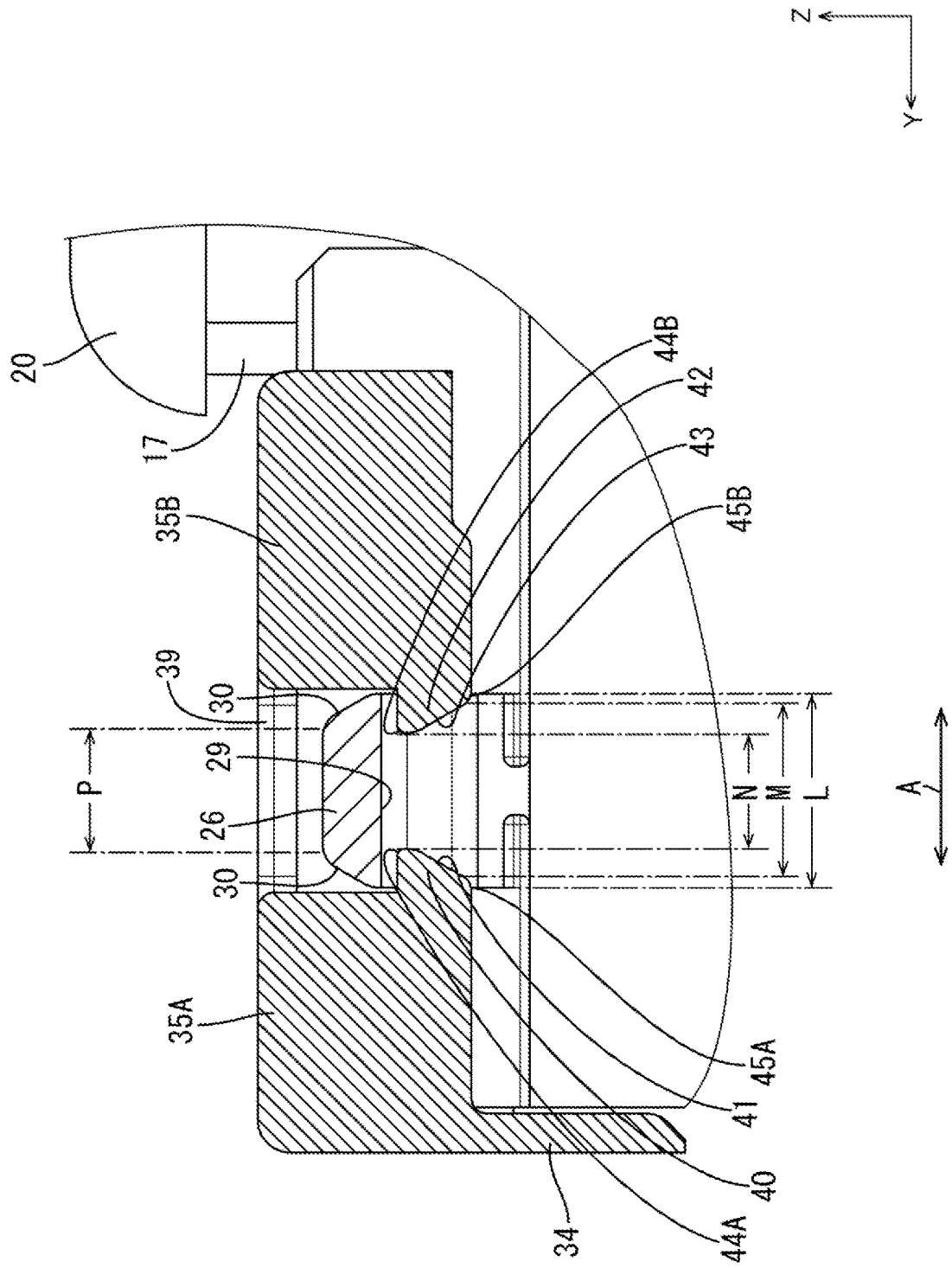
FIG. 16 is a cross-sectional view along line XVI-XVI in FIG. 12.
Figure 17:
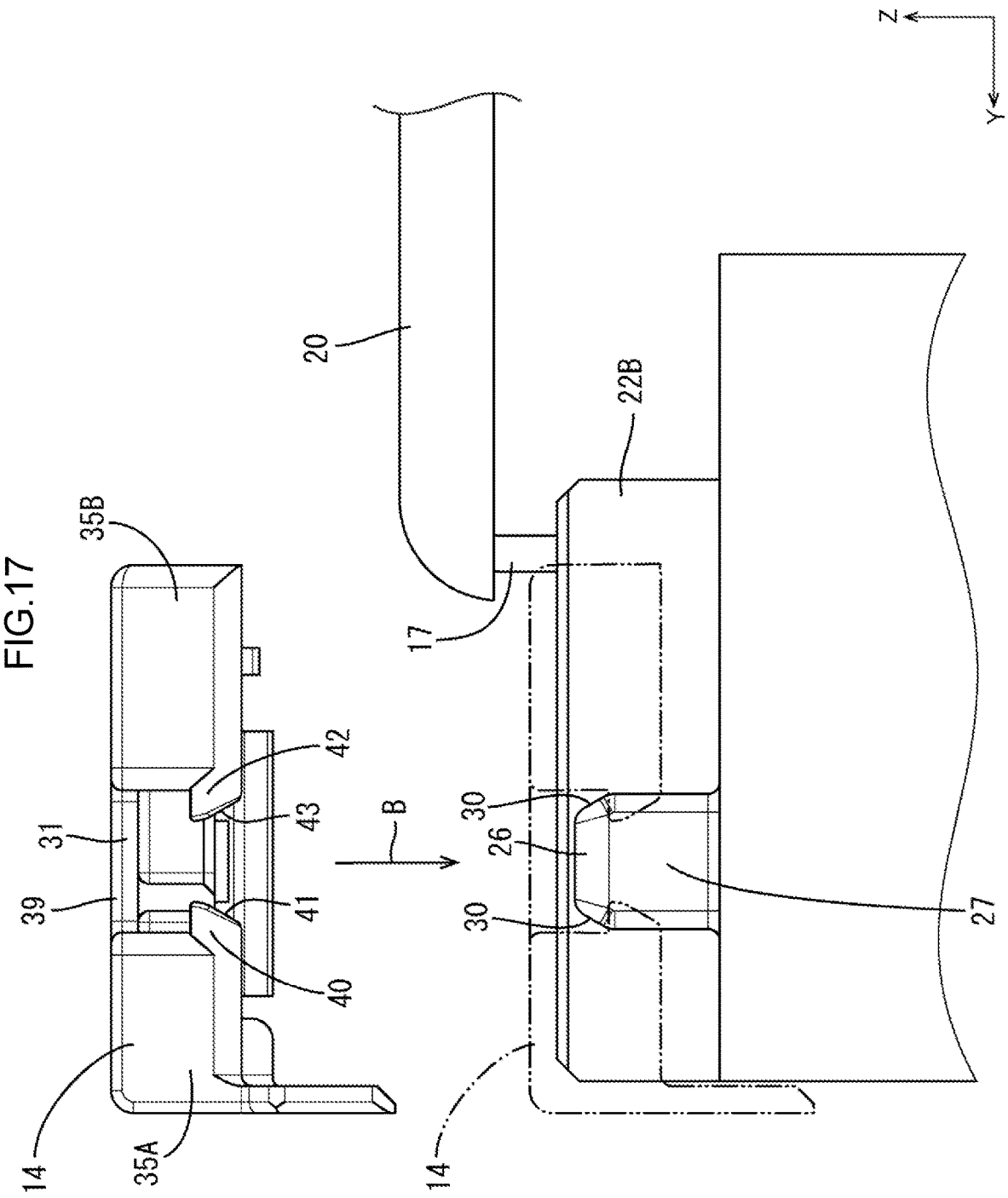
FIG. 17 is a magnified left side view illustrating a portion of a busbar holding plate and a portion of the busbar assembly including the busbar cover before attached to the busbar holding plate.

As illustrated in FIG. 16, the first protrusion 40 and the second protrusion 42 protrude toward each other. The first protrusion 40 that protrudes toward the rear side includes a first edge 44A farther from the busbar holding face 21 and a second edge 45A closer to the busbar holding face 21. The second protrusion 42 that protrudes toward the front side includes a first edge 44B farther from the busbar holding face 21 and a second edge 45B closer to the busbar holding face 21. The first edges 44A and 44B are separated from each other in, the axial direction A (the front-rear direction) with a first gap. A distance N between the first edges 44A and 44B in the axial direction A (a dimension of the first gap in the axial direction A) is less than the dimension L of the through hole 29 in the axial direction A.

The second edges 45A and 45B are separated from each other in the axial direction A with a second gap. A distance M between the second edges 45A and 45B in the axial direction A (a dimension of the second gap in the axial direction A) is greater than the distance N. The second edge 45A of the first protrusion-side slope 41 defines a border between the lower surface of the first protrusion 40 and the first protrusion-side slope 41. The second edge 45B of the second protrusion-side slope 43 defines a border between the lower surface of the second protrusion 42 and the second protrusion-side slope 43.

Rotation Mechanism of the Busbar Cover 14

Figure 20:
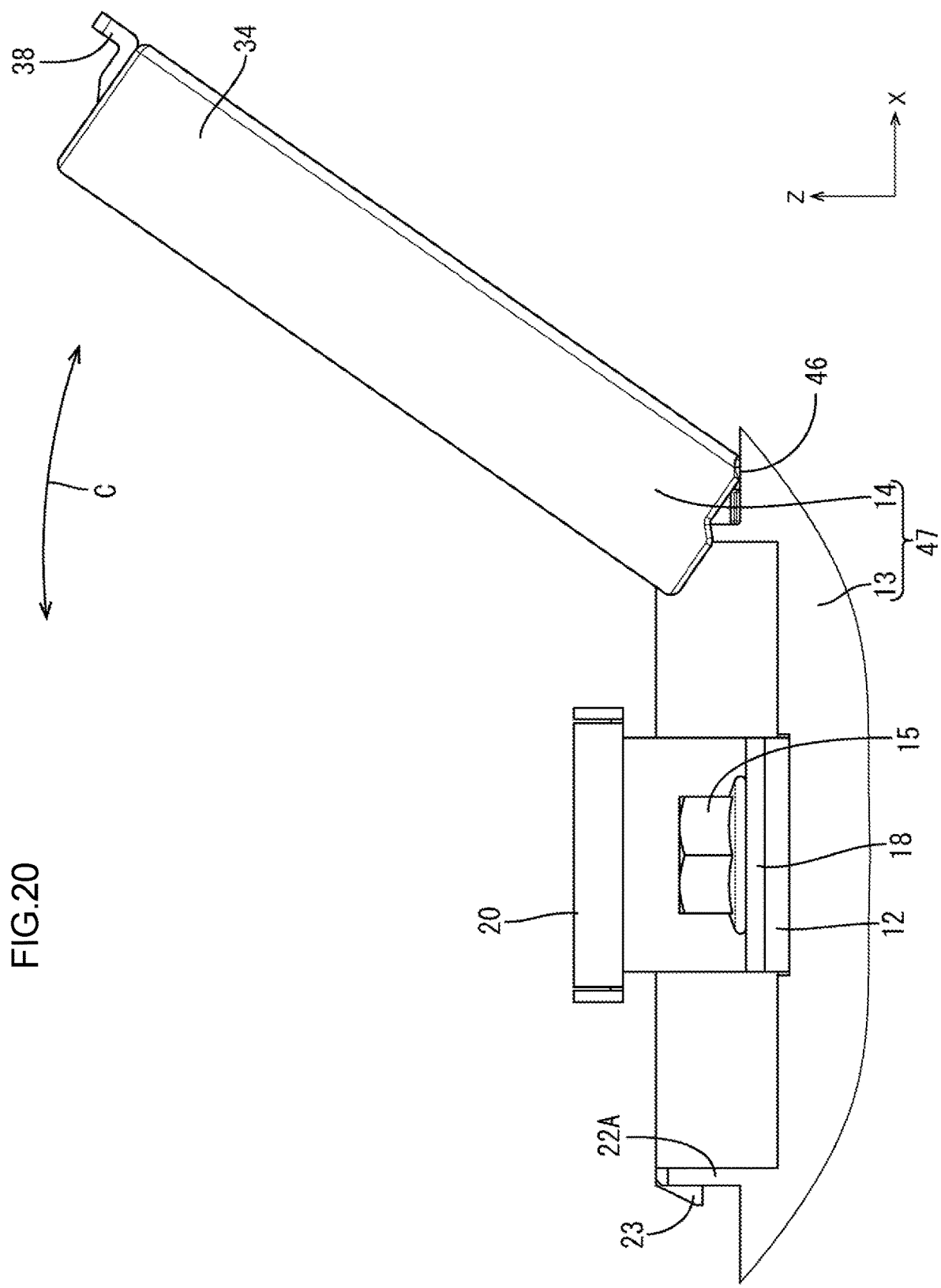
FIG. 20 is a magnified left side view of the busbar assembly including the busbar cover in an uncovering position.
Figure 21:
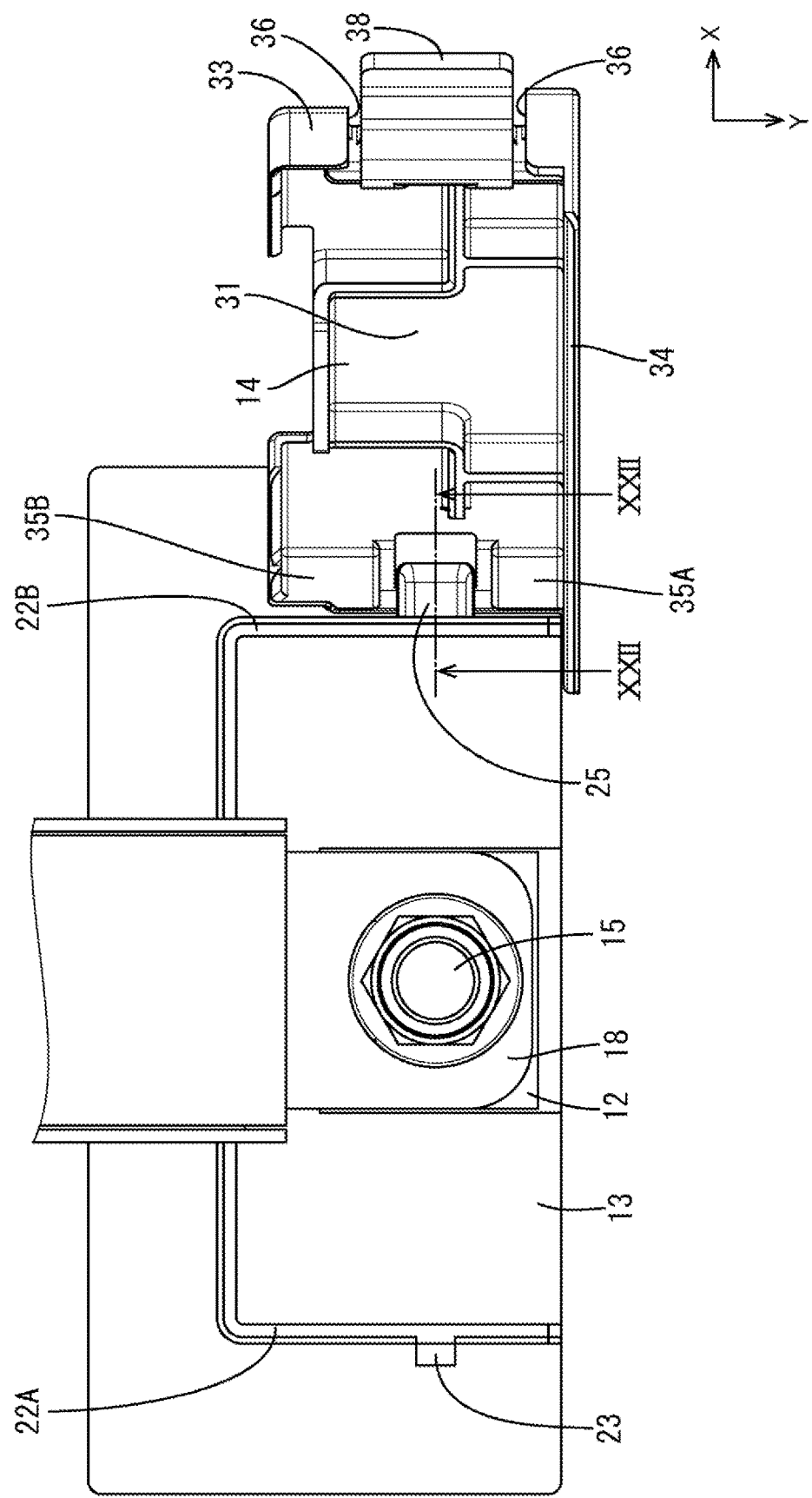
FIG. 21 is a magnified view of a portion of the busbar assembly including the busbar cover in the uncovering position.
Figure 22:
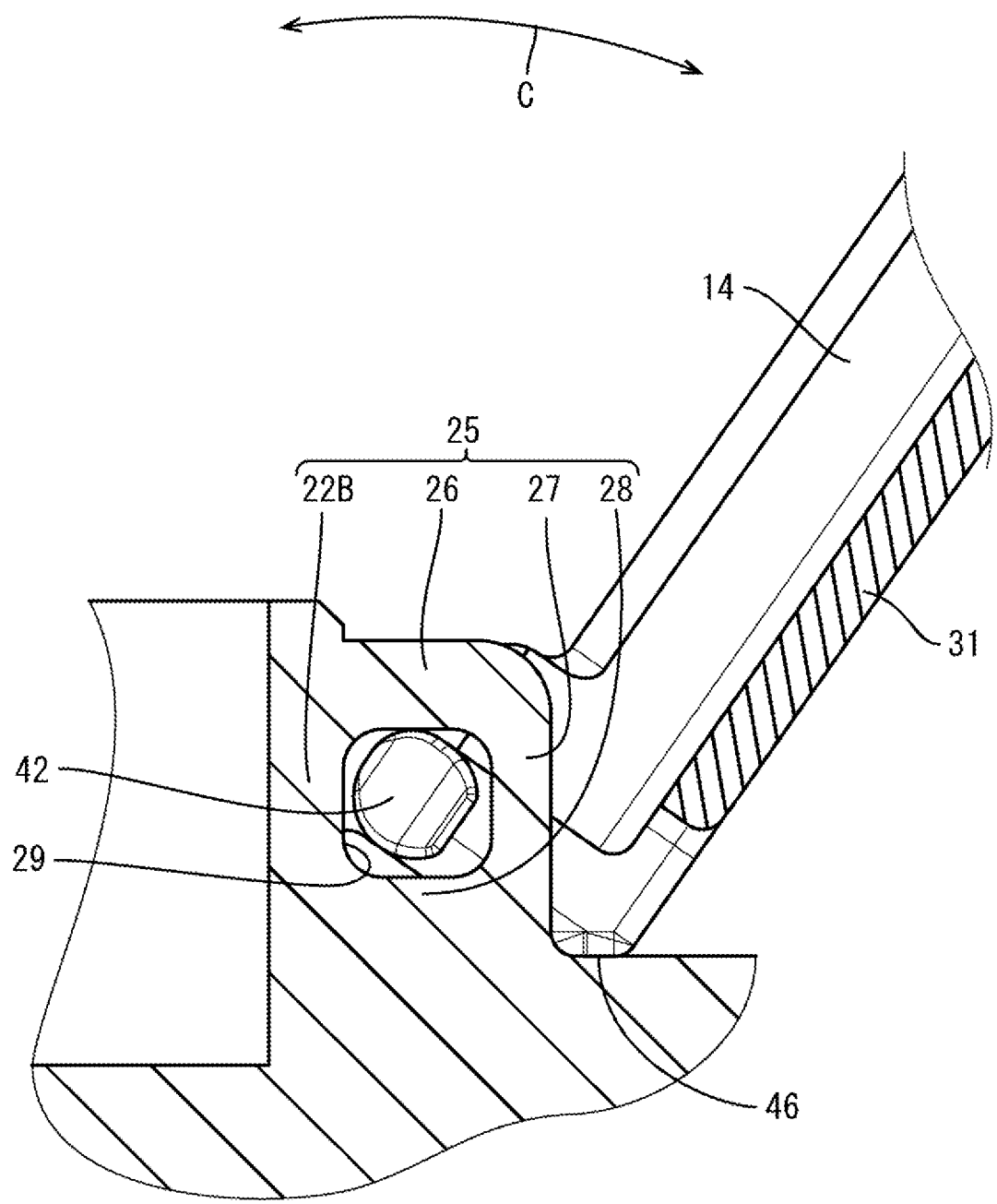
FIG. 22 is a cross-sectional view alone line XXII-XXII in FIG. 21.

As illustrated in FIGS. 20 and 22, the busbar cover 14 is rotatable about the first protrusion 40 and the second protrusion 42 in a direction indicated by arrow C when the first protrusion 40 and the second protrusion (an example of two protrusions) are in the through hole 29 of the bearing 25.

Figure 12:
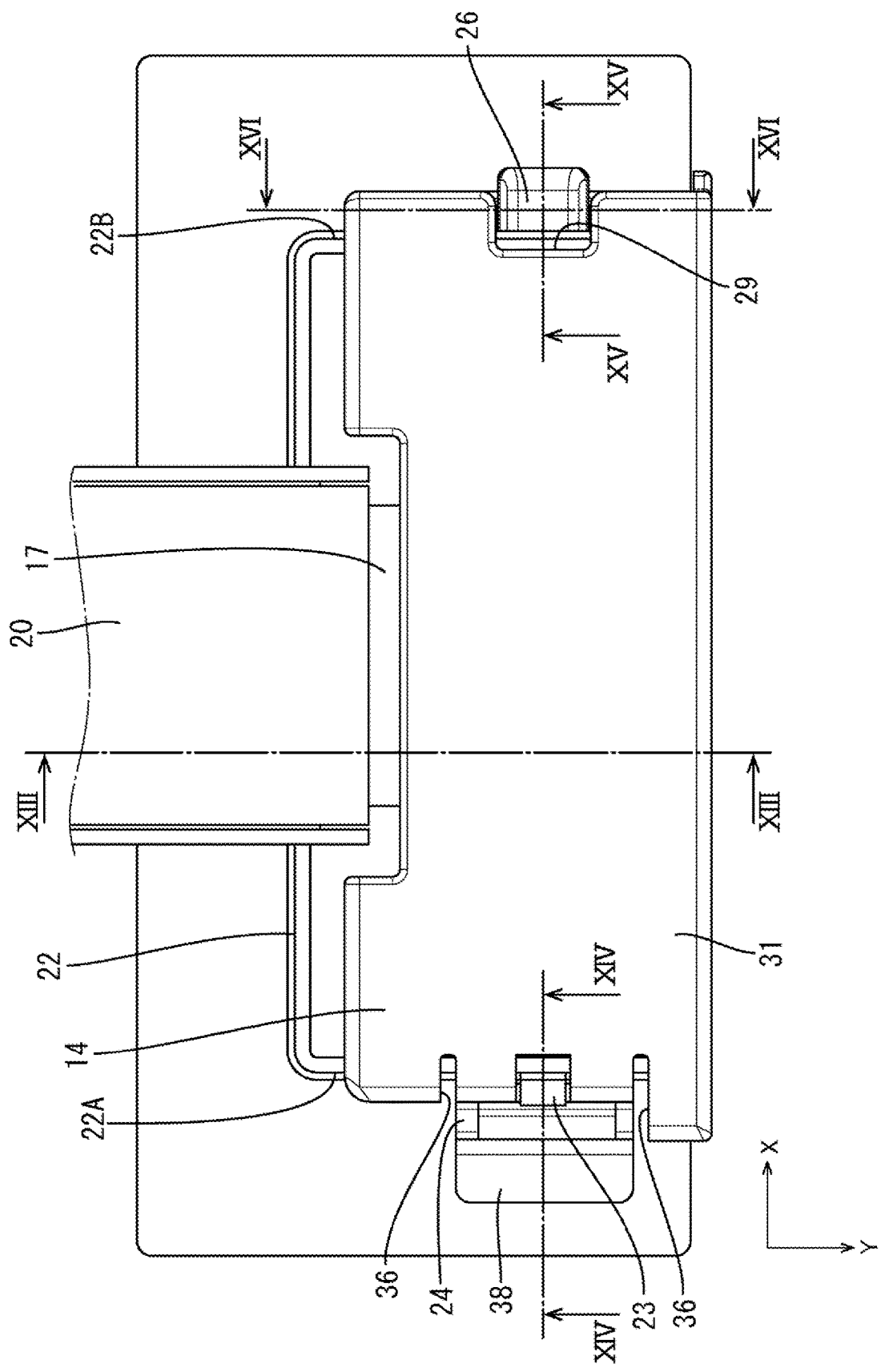
FIG. 12 is a plan view of the busbar assembly.
Figure 14:
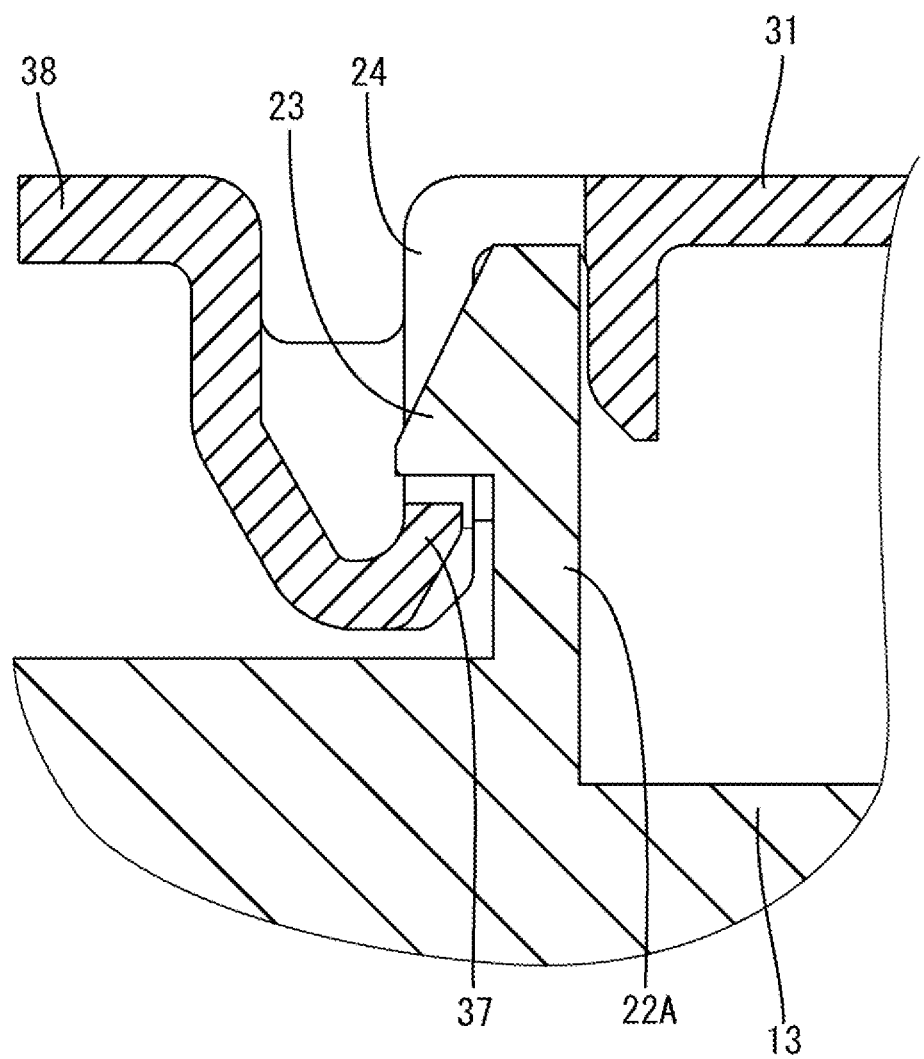
FIG. 14 is a cross-sectional view along line XIV-XIV in FIG. 12.
Figure 15:
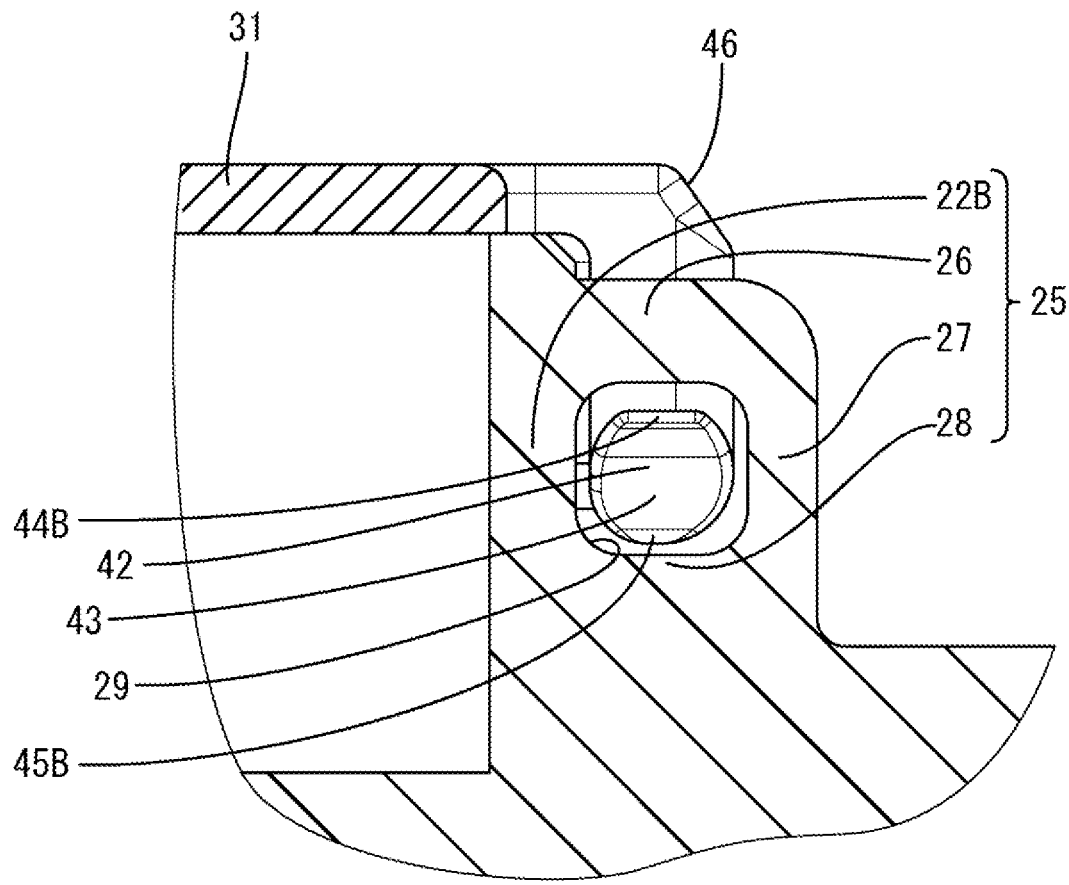
FIG. 15 is a cross-sectional view along line XV-XV in FIG. 12.

As illustrated in FIGS. 12 to 14, when the lock portion 24 of the busbar cover 14 is engaged with the locking tab 23 of the busbar holding plate 13 and the first protrusion 40 and the second protrusion 42 are in the through hole 29 of the bearing 25, the busbar 12 held by the busbar holding plate 13, the bolt 15, and the connecting end portion 18 connected with the busbar 12 with the bolt 15 are covered with the busbar cover 14. The busbar 12, the bolt 15, and the connecting end portion 18 are insulated by the busbar cover 14. A position of the busbar cover 14 with the lock portion 24 of the busbar cover 14 engaged with the locking tab 23 of the busbar holding plate 13 and the first protrusion 40 and the second protrusion 42 disposed in the through hole 29 of the bearing 25 is referred to as a covering position of the busbar cover 14.

When the lock portion 24 of the busbar cover 14 is disengaged from the locking tab 23 of the busbar holding plate 13 and the first protrusion 40 and the second protrusion 42 are in the through hole 29 of the bearing 25, the busbar cover 14 may be rotated about the first protrusion 40 and the second protrusion 42 in the direction indicated by arrow C to uncover the busbar 12. A position of the busbar cover 14 described above is referred to as an uncovering position of the busbar cover 14.

The busbar cover 14 can be rotatable about the first protrusion 40 and the second protrusion 42 between the covering position and the uncovering position. The busbar cover 14 can be rotated with an angle of rotation equal to or greater than 90 degrees. Specifically, the busbar cover 14 can be rotated with the angle of rotation about 120 degrees.

The top wall 31 includes an over rotation restriction portion 46. When the busbar cover 14 is rotated to the uncovering position, the over rotation restriction portion 46 contacts the upper surface of the busbar holding plate 13 and thud the busbar cover 14 does not rotate any further. The over rotation restriction portion 46 is formed in a predefined shape by chamfering the upper right edge of the busbar cover 14 with a predefined angle.

When the busbar cover 14 is in the covering position, the first protrusion 40 and the second protrusion 42 contact the upper surface of the lower wall 28 of the bearing 25, that is, downward movement of the first protrusion 40 and the second protrusion 42 is restricted. A dimension of the lower wall 28 in the front-rear direction is greater than a dimension of the upper wall 26 in the front-rear direction. Therefore, the busbar cover 14 in the covering position is less likely to be removed from the busbar holding plate 13. The lower wall 28 is an example of a first stopper.

When the busbar cover 14 is at the uncovering portion, the first protrusion 40 and the second protrusion 42 contact the outer surface of the right wall portion 22B of the vertical wall 22, that is, leftward movement of the first protrusion 40 and the second protrusion 42 is restricted. The dimension of the right wall portion 22B of the vertical wall 22 in the front-rear direction is greater than the dimension of the side wall 27 in the front-rear direction. Therefore, the busbar cover 14 in the uncovering position is less likely to be removed from the busbar holding plate 13. The right wall portion 22B of the vertical wall 22 is an example of a second stopper.

Assembly Process

An assembly process of the electric storage module 10 will be described. The assembly process described below is only an example. An assembly process including steps other than steps described below may be included in the technical scope of the present invention.

The electric storage components 11 are arranged next to one another and the adjacent electrodes are connected with the connecting members to electrically connect the electric storage components 11 in series. The busbar holding plates 13 are fixed to the electric storage components 11 with known fixing members such as screws. One of the busbars 12 is connected with the positive electrode of the first-end electric storage component 11 and held by one of the busbar holding plates 13. The other busbar 12 is connected with the negative electrode of the second-end electric storage component 11 and held by the other busbar holding plate 13. The busbars 12 are exposed through openings of the vertical walls 22 on the upper side.

Steps for attaching the busbar cover 14 to the busbar holding plate 13 of the first-end electric storage component 11 will be described. The other busbar cover 14 can be attached to the busbar holding plate 13 of the second-end electric storage component 11 in the same manner.

The busbar cover 14 is moved in a direction from the upper side to the lower side (the attachment direction B) toward the busbar holding plate 13 such that the lock portion 24 of the busbar cover 14 is positioned relative to the locking tab 23 of the busbar holding plate 13 and the first protrusion 40 and the second protrusion 42 of the busbar cover 14 are positioned relative to the bearing 25 of the busbar holding plate 13. The busbar cover 14 is brought closer to the vertical wall 22 of the bearing 25 of the busbar holding plate 13 from the upper side.

Figure 18:
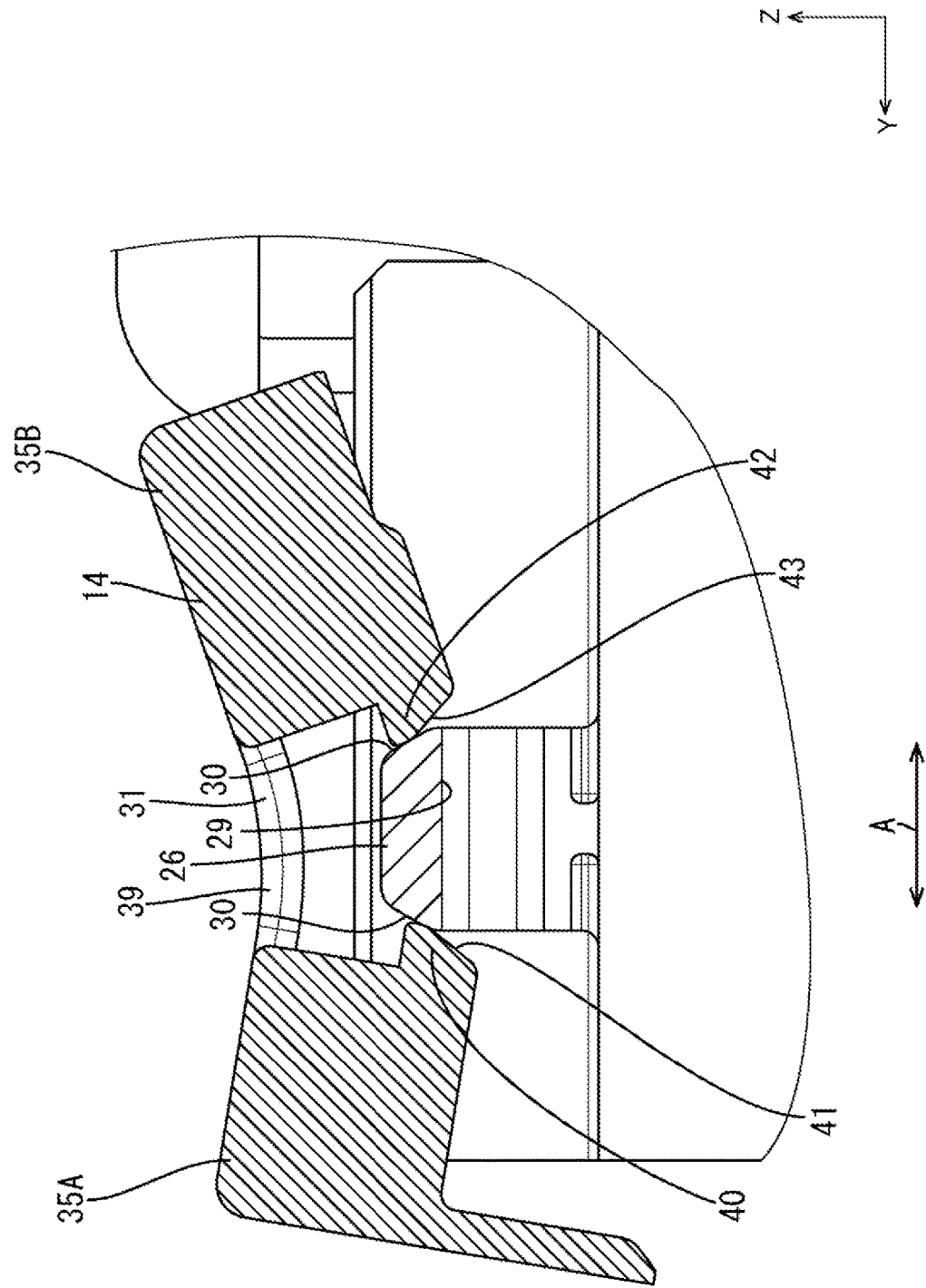
FIG. 18 is a magnified view illustrating a top wall of the busbar cover which is deformed.
Figure 19:
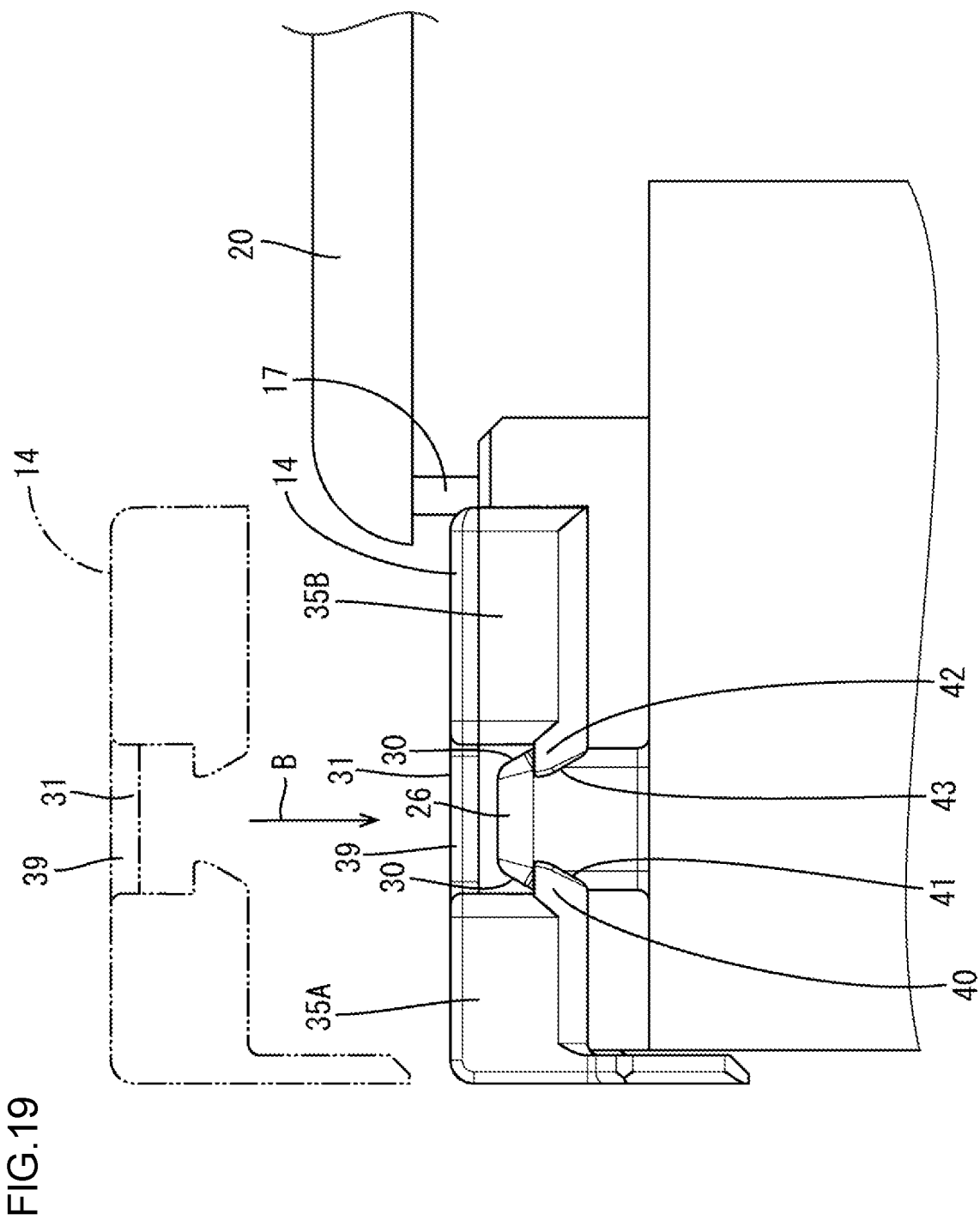
FIG. 19 is a magnified left side view of a portion of the busbar assembly including the busbar cover attached to the busbar holding plate.

The busbar cover 14 is moved until the first protrusion-side slope 41 of the first protrusion 40 and the second protrusion-side slope 43 of the second protrusion 42 contact the respective bearing-side slopes 30 of the upper wall 26 of the bearing 25. Then, the busbar cover 14 is pushed downward until the first protrusion-side slope 41 and the second protrusion-side slope slide on the bearing-side slopes 30. A force is applied to the busbar cover 14 such that the gap between the first edge 44A of the first protrusion 40 and the first edge 44B of the second protrusion 42 expands in the front-rear direction. As a result, the top wall 31 of the busbar cover 14 warps downward as illustrated in FIG. 18 and the gap between the first edge 44A of the first protrusion 40 and the first edge 44B of the second protrusion 42 expands in the front-rear direction. The top wall 31 of the busbar cover 14 is flexible to deform such that the gap between the first edge 44A of the first protrusion 40 and the first edge 44B of the second protrusion 42 becomes equal to or greater than dimension of the through hole 29 in the front-rear direction. Namely, the flexibility of the top wall 31 is defined such that the gap between the upper edges 44A and 44B expands in the front-rear direction to allow the upper wall 26 of the beating 25 to pass through the gap during attachment of the busbar cover 14 to the busbar holding plate 13 and restore its original shape when the passing of the upper wall 26 through the gap is complete.

When the busbar cover 14 is pressed downward and the first protrusion 40 and the second protrusion 42 are moved beyond the upper wall 26 of the bearing 25, the top wall 31 of the busbar cover 14 recovers from the deformation and the first protrusion 40 and the second protrusion 42 are placed in the through hole 29 of the bearing 25.

The connecting portion 37 of the lock portion 24 of the busbar cover 14 contacts an upper section of the locking tab 23 of the busbar holding plate 13. The connecting portion 37 slides on the slope of the locking tab 23 which inclines toward the upper side. The connecting portion 37 that is pressed against the slope of the locking tab 23 deforms. As the busbar cover 14 is further pressed downward, the connecting portion 37 of the lock portion 24 moves beyond the locking tab 23. The connecting portion 37 recovers from the deformation and the contacts the lower surface of the locking tab 23. The lock portion 24 of the busbar cover 14 remains in this state and upward movement of the lock portion 24 is restricted.

Through the steps described above, the busbar cover 14 is set in the covering position and the busbar 12 is covered with the busbar cover 14.

Next, steps for rotating the busbar cover 14 to the uncovering position will be described. The assembly person pinches the holding portion 38 with his or her fingers and applies a force to the holding portion 38 until the lock portion 24 is deformed and disengaged from the locking tab 23. While pinching the holding portion 38, the assembly person rotates the busbar cover 14 in the direction indicated by arrow C. When the busbar cover 14 is rotated to the uncovering position, the over rotation restricting portion 46 of the busbar cover 14 contacts the upper surface of the busbar holding plate 13 and thus the busbar cover 14 does not rotate any further.

While the busbar cover 14 is maintained in the uncovering position, the connecting end portion 18 of the external device connecting member 17 is placed over the busbar 12 and the external device connecting member 17 is fixed to the busbar 12 with the bolt 15.

Then, the busbar cover 14 is rotated in the direction indicated by arrow C to the covering position and the lock portion 24 of the busbar cover 14 is engaged with the locking tab 23 of the busbar holding plate 13. The busbar cover 14 is maintained in the covering position. The busbar 12, the bolt 15, and the connecting end portion 18 of the external device connecting member 17 are insulated with the busbar cover 14.

According to the configuration of the busbar assembly 100 and through the steps for attaching the busbar cover 14 to the busbar holding plate 13, the busbar cover 14 can be easily attached to the busbar holding plate 13 with simple configuration.

When the busbar cover 14 is in the covering position, the busbar 12 is covered with the busbar cover 14. Therefore, foreign substances are less likely to adhere to the busbar 12.

The busbar 12 can be exposed only by rotating the busbar cover 14 to open and thus the external device connecting member 17 can be connected with the busbar 12 through simple steps. Therefore, work efficiency in connection of the external device connecting member 17 with the busbar 12 improves.

According to the first protrusion 40 and the second protrusion 42 that deform such that the gap between the upper edges 44A and 44B becomes equal to or greater than the dimension of the through hole 29 in the axial direction A and restore their original shapes, the first protrusion 40 and the second protrusion 42 are properly held in the bearing 25. Therefore, the first protrusion 40 and the second protrusion 42 are less likely to come out of the bearing 25.

According to the configuration of the top wall 31, the section of the top wall 31 including the cutout 39 can be easily deformed. Therefore, the top wall 31 can be easily deformed until the gap between the first edge 44A of the first protrusion 40 and the first edge 44B of the second protrusion 42 is about equal to or greater the dimension of the through hole 29 in the axial direction A of the through hole 29. According to the configuration, a less force is required for expanding the gap between the first edge 44A of the first protrusion 40 and first edge 44B of the second protrusion 42 during the attachment of the busbar cover 14 to the busbar holding plate 13. Therefore, work efficiency in attachment of the busbar cover 14 to the busbar holding plate 13 improves.

If the first protrusion 40 and the second protrusion 42 in the through hole 29 move, they contact the right wall portion 22B of the vertical wall 22, the upper wall 26, the side wall 27, and the lower wall 28 if they move. Namely, the movement of the first protrusion 40 and the second protrusion 42 is restricted by the right wall portion 22B of the vertical wall 22, the upper wall 26, the side wall 27, and the lower wall 28. Therefore, the first protrusion 40 and the second protrusion 42 are less likely to come out of the through hole 29.

According to the first protrusion 40, the second protrusion 42, and the bearing-side slopes 30, the first protrusion 40 and the second protrusion 42 easily deform such that the gap between the first edge 44A and first edge 44B expands. Therefore, the work efficiency in attachment of the busbar cover 14 to the busbar holding plate 13 improves.

According to the first protrusion-side slope 41, the second protrusion-side slope 43, and the upper wall 26 of the bearing 25, the first protrusion 40 and the second protrusion 42 are easily deformed such that the gap between the first protrusion 40 and the second protrusion 42 expands as the busbar cover 14 approaches the busbar holding face 21. Therefore, the work efficiency in attachment of the busbar cover 14 to the busbar holding plate 13 improves.

According to the lower wall 28 (an example of the first stopper) and the right wall portion 22B (an example of the second stopper), the busbar cover 14 either in the covering position or in the uncovering position is less likely to be removed from the busbar holding plate 13.

The lower wall 28 that has the dimension in the axial direction A of the bearing 25 greater than the dimension of the upper wall 26 in the axial direction A function as the first stopper. The right wall portion 22B that has the dimension in the axial direction A is greater than the dimension of the side wall 27 in the axial direction functions as the second stopper.

According to the lock portion 24 of the busbar cover 14 provided on an opposite side from the first protrusion 40 and the second protrusion 42 and engaged with the locking tab 23 when the busbar cover 14 is in the covering position, the busbar cover 14 in the covering position is less likely to rotate unless the lock portion 24 is disengaged from the locking tab 23 of the busbar holding plate 13. Therefore, the busbar 12 is properly protected from foreign substances such as dust and moisture.

According to the over rotation restriction portion 46 that contacts the busbar holding plate 13 when the busbar cover 14 is in the uncovering position, the busbar cover 14 is less likely to rotate beyond the uncovering position. Therefore, a problem resulting from the over rotation of the busbar cover 14 is less likely to occur.

According to the over rotation restriction portion 46, the busbar cover 14 can be rotated with the angle of rotation equal to of greater than 90 degrees. Namely, the busbar cover 14 can be rotated more than 90 degrees to uncover the busbar 12. Therefore, the busbar 12 has easy access when the busbar cover 14 is in the uncovering position. Therefore, the work efficiency in connection of the external device with the busbar 12 improves.

According to the busbar holding plate 13 that is made of the material having the rigidity higher than the rigidity of the material of the busbar cover 14, the bearing 25 of the busbar holding plate 13 is less likely to deform when the first protrusion 40 and the second protrusion 42 of the busbar cover 14 contact the bearing 25. This is preferable for the configuration busbar cover 14 in which the first protrusion 40 and the second protrusion 42 deform such that the gap between the first protrusion 40 and the second protrusion 42 expands in the axial direction A.

Other Embodiments

The technology described herein is not limited to the embodiment, which have been described using the foregoing descriptions and the drawings. For example, embodiments described below are also within the technical scope of the technology described herein.

(1) The top wall 31 may not include the cutout 39.

(2) The bearing 25 may have a cylinder shape or a polygonal tubular shape such as a pentagonal tubular shape and an hexagonal tubular shape.

(3) Each busbar holding plate 13 may include two or more bearings and each busbar cover 14 may include multiple pairs of protrusions.

(4) The bearing 25 may not include the bearing-side slopes 30.

(5) The first protrusion 40 may not include the first protrusion-side slope 41 and the second protrusion 42 may not include the second protrusion-side slope 43.

(6) The busbar holding plate 13 may not include the over rotation restriction portion 46.

(7) The busbar holding plate 13 may be made of the same material as the busbar cover 14 or material having rigidity less than the rigidity of the material of the busbar cover 14.

(8) The connecting end portions 18 of the external device connecting members 17 may be connected with the respective busbars 12 through laser welding, ultrasonic welding, or resistance welding.

(9) The electric storage components 11 may be capacitors.

(10) The bearing may include a recess instead of the through hole 99.

The invention claimed is:

1. A busbar module comprising:
    a busbar holding plate comprising:
        a busbar holding face for holding a busbar; and
        a bearing including a hole extending in an axial direction parallel to the busbar holding face and at least one wall to define the hole; and
    a busbar cover attached to the busbar holding plate for covering the busbar, wherein
        the busbar cover comprises two protrusions protruding toward each other in the axial direction at positions corresponding to the hole,
        the protrusions are opposed to each other with a gap less than a dimension of the hole in the axial direction,
        the protrusions are disposed in the hole of the bearing to rotate the busbar cover about the protrusions between a covering position to cover the busbar and an uncovering position to uncover the busbar, and
        the busbar cover is flexible to deform such that the gap between the protrusions expands in the axial direction to allow the at least one wall of the bearing to pass through the gap during attachment of the busbar cover to the busbar holding plate and restores an original shape of the busbar cover when passing of the at least one wall through the gap is complete.

2. The busbar module according to claim 1, wherein flexibility of the busbar cover is defined such that a gap between edges of the protrusions the closest to each other expands equal to or larger than the dimension of the hole in the axial direction.

3. The busbar module according to claim 2, wherein
    the busbar cover includes a top wall and side walls that extend from one of side edges of the top wall,
    the side walls are separated from each other in the axial direction,
    the protrusions are included in the side walls, respectively, and
    the top wall includes a cutout in a section of the one of side edges between the side walls.

4. The busbar module according to claim 1, wherein
    the bearing comprises:
        a first vertical wall extending in a direction normal to the busbar holding face adjacent to the busbar;
        a first horizontal wall and a second horizontal wall extending from the vertical wall in a direction parallel to the busbar holding face and being separated from each other; and
        a second vertical wall connected between distal ends of the first horizontal wall and the second horizontal wall, and
    the hole is defined by the vertical wall, the first horizontal wall, the second horizontal wall, and the second vertical wall.

5. The busbar module according to claim 4, wherein
    the first horizontal wall of the bearing has a rectangular frustum shape including a base closer to the busbar holding face, a top farther from the busbar holding face and smaller than the base, and bearing-side slopes between the top and the base and separated from each other in the axial direction, the busbar cover is attached to the busbar holding plate in the direction normal to the busbar holding face.

6. The busbar module according to claim 1, wherein
the protrusions include protrusion-side slopes that are opposed to each other and angled relative to the axial direction,
the protrusion side slopes include first edges that are separated from each other in the axial direction with a first gap therebetween and second edges that are separated from each other in the axial direction with a second gap therebetween,
the first gap is less than the dimension of the hole in the axial direction, and
the second gap is greater than the first gap.

7. The busbar module according to claim 1, wherein the busbar holding plate comprises:
  a first stopper contacting the busbar cover in the covering position to restrict the busbar cover from being removed from the busbar holding plate; and
  a second stopper contacting the bulbar cover in the uncovering position to restrict the busbar cover from being removed from the busbar holding plate.

8. The bulbar module according to claim 7, wherein the bearing comprises:
  a first vertical wall extending in a direction normal to the busbar holding face adjacent to the busbar;
  a first horizontal wall and a second horizontal wall extending from the vertical wall in a direction parallel to the busbar holding face and being separated from each other; and
  a second vertical wall connected between distal ends of the first horizontal wall and the second horizontal wall,
the second horizontal wall has a dimension in the axial direction greater than a dimension of the first horizontal wall in the axial direction,
the first stopper includes the second horizontal wall,
the first vertical wall has a dimension in the axial direction greater than a dimension of the second vertical wall in the axial direction, and
the second stopper includes the first vertical wall.

9. The busbar module according to claim 1, wherein
the busbar cover includes a locking portion engaged with the busbar holding plate when the busbar cover is in the covering position, and
the locking portion is located at another edge of the busbar cover opposite from the one of the edges at which the protrusions are provided.

10. The busbar module according to claim 1, wherein the busbar cover includes an over rotation restriction portion that contacts the busbar holding plate when the busbar cover is in the uncovering position to restrict the busbar cover from rotating any further.

11. The busbar module according to claim 10, wherein the over rotation restriction portion is configured such the busbar cover is rotatable with an angle of rotation equal to or greater than 90 degrees.

12. The busbar module according to claim 1, wherein the busbar holding plate is made of material having rigidity greater than rigidity of material of the busbar cover.

* * * * *